(12) United States Patent
Kim et al.

(10) Patent No.: US 10,482,346 B2
(45) Date of Patent: Nov. 19, 2019

(54) ELECTRONIC DEVICE FOR PROCESSING IMAGE AND METHOD FOR CONTROLLING THE SAME

(71) Applicant: Samsung Electronics Co., Ltd., Suwon-si, Gyeonggi-do (KR)

(72) Inventors: Chang-Hoon Kim, Suwon-si (KR); Ki-Huk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 134 days.

(21) Appl. No.: 15/172,873

(22) Filed: Jun. 3, 2016

(65) Prior Publication Data

US 2016/0364602 A1 Dec. 15, 2016

(30) Foreign Application Priority Data

Jun. 9, 2015 (KR) ........................ 10-2015-0081541

(51) Int. Cl.
| | |
|---|---|
| *G06K 9/52* | (2006.01) |
| *G06K 9/46* | (2006.01) |
| *G06T 7/73* | (2017.01) |
| *G06T 11/00* | (2006.01) |
| *G06K 9/00* | (2006.01) |
| *G06T 15/50* | (2011.01) |

(52) U.S. Cl.
CPC ....... *G06K 9/4642* (2013.01); *G06K 9/00228* (2013.01); *G06K 9/4652* (2013.01); *G06K 9/4661* (2013.01); *G06K 9/52* (2013.01); *G06T 7/73* (2017.01); *G06T 11/001* (2013.01); *G06T 15/50* (2013.01); *G06T 2207/30201* (2013.01)

(58) Field of Classification Search
CPC ............ G06K 9/4642; G06K 9/00228; G06K 9/4661; G06K 9/4652; G06K 9/52; G06T 15/50; G06T 11/001; G06T 7/73; G06T 2207/30201
USPC ........ 382/103, 115, 118, 117, 162, 151, 173, 382/190, 214, 291; 345/419, 420, 426, 345/422, 582, 427, 653, 654; 356/601, 356/602, 603, 604, 605, 606, 607, 608, 356/609, 610, 611, 612, 613
See application file for complete search history.

(56) References Cited

U.S. PATENT DOCUMENTS

| | | | | |
|---|---|---|---|---|
| 7,027,619 | B2 * | 4/2006 | Pavlidis ............ | G06K 9/00228 382/115 |
| 7,848,544 | B2 * | 12/2010 | Mariani ............ | G06K 9/00288 382/118 |
| 8,315,461 | B2 * | 11/2012 | Free .................. | G06K 9/00241 345/426 |
| 9,501,719 | B1 * | 11/2016 | Horovitz ............ | G06K 9/00201 |
| 10,015,464 | B2 * | 7/2018 | Zirnheld ............ | H04N 5/23229 |
| 10,063,826 | B2 * | 8/2018 | Kitajima ................. | G03B 7/08 |
| 2011/0182520 | A1 | 7/2011 | Free | |
| 2013/0050214 | A1 | 2/2013 | Free | |
| 2015/0077323 | A1 * | 3/2015 | Ramaswamy .......... | G06F 3/012 345/156 |

* cited by examiner

*Primary Examiner* — Sheela C Chawan
(74) *Attorney, Agent, or Firm* — Jefferson IP Law, LLP

(57) ABSTRACT

A method for controlling an electronic device is provided. The method includes obtaining an image, detecting at least one object in a facial area from the image, and applying a virtual light source effect to the image based on an attribute of the detected object and displaying the image.

27 Claims, 34 Drawing Sheets

ELECTRONIC DEVICE FOR PROCESSING IMAGE AND METHOD FOR CONTROLLING THE SAME

CROSS-REFERENCE TO RELATED APPLICATION(S)

This application claims the benefit under 35 U.S.C. § 119(a) of a Korean patent application filed on Jun. 9, 2015 in the Korean Intellectual Property Office and assigned Serial number 10-2015-0081541, the entire disclosure of which is hereby incorporated by reference.

TECHNICAL FIELD

The present disclosure relates to electronic devices for controlling images and methods for controlling the same. More particularly, the present disclosure relates to electronic devices adjusting the attribute of pixels in images and methods for controlling the same.

BACKGROUND

Techniques for processing facial images or other images are nowadays under intensive development. Image processing apparatuses of the related art obtain images including a figure's facial area and apply an additional light source effect to the obtained images. For example, an image processing apparatus of the related art determines the position of an additional light source to apply an additional light source effect, readjusts the brightness of image and displays the readjusted image.

Such image processing apparatuses of the related art carry out three-dimensional (3D) modeling to apply an additional light source effect. For example, an image processing apparatus of the related art performs 3D modeling by placing the facial area of an obtained image on 3D spatial coordinates. Further, the image processing apparatus of the related art adjusts the brightness of the facial area by putting an additional light source on coordinates in the 3D spatial coordinates, allowing the additional light source to generate light, and performing ray tracing.

3D modeling and ray tracing may be an algorithm consuming much computation and time even in computers equipped with a high-performance computation module. Thus, electronic devices having relatively limited computational functions, such as portable electronic devices, have difficulty in providing an additional light source effect in real-time.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are provided to address at least the above-mentioned problems and/or disadvantages, and to provide at least the advantages described below. Accordingly, an aspect of the present disclosure is to provide electronic devices for controlling images and methods for controlling the same.

In accordance with an aspect of the present disclosure, a method for controlling an electronic device is provided. The method includes obtaining an image, detecting at least one object in a facial area from the image, applying a virtual light source effect to the image based on an attribute of the detected object, and displaying the image.

In accordance with another aspect of the present disclosure, an electronic device is provided. The electronic device includes a display, a processor electrically connected to the display, and a memory electrically connected to the processor, wherein the memory may store instructions that when executed, direct the processor to obtain an image, detect at least one object in a facial area from the image, apply a virtual light source effect to the image based on an attribute of the detected object, and display the image.

In accordance with another aspect of the present disclosure, an electronic device is provided. The electronic device includes display, a processor electrically connected to the display, and a memory electrically connected to the processor, wherein the memory may store instructions that when executed, direct the processor to obtain an image, detect an interested area from the image, adjust an attribute of each of at least one pixel of the interested area, and display the image based on a result of the detection of at least one object in the detected interested area.

In accordance with an aspect of the present disclosure, a method for controlling an electronic device is provided. The method includes obtaining an image, detecting an interested area from the image, adjusting an attribute of each of at least one pixel of the interested area, and displaying the image based on a result of the detection of at least one object in the detected interested area.

In accordance with an aspect of the present disclosure, a method for controlling an electronic device is provided. The method includes displaying an image, controlling the display of a first portion of a facial area in the displayed image to be brighter than a remaining portion, and controlling the display of a second portion of the facial area in the displayed image to be darker than a remaining portion.

In accordance with another aspect of the present disclosure, an electronic device that may apply an additional light source effect without 3D modeling and a method for controlling the same is provided. The electronic device may apply an additional light source effect based only on the result of analysis of an image, allowing for real-time application of an additional light source effect.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
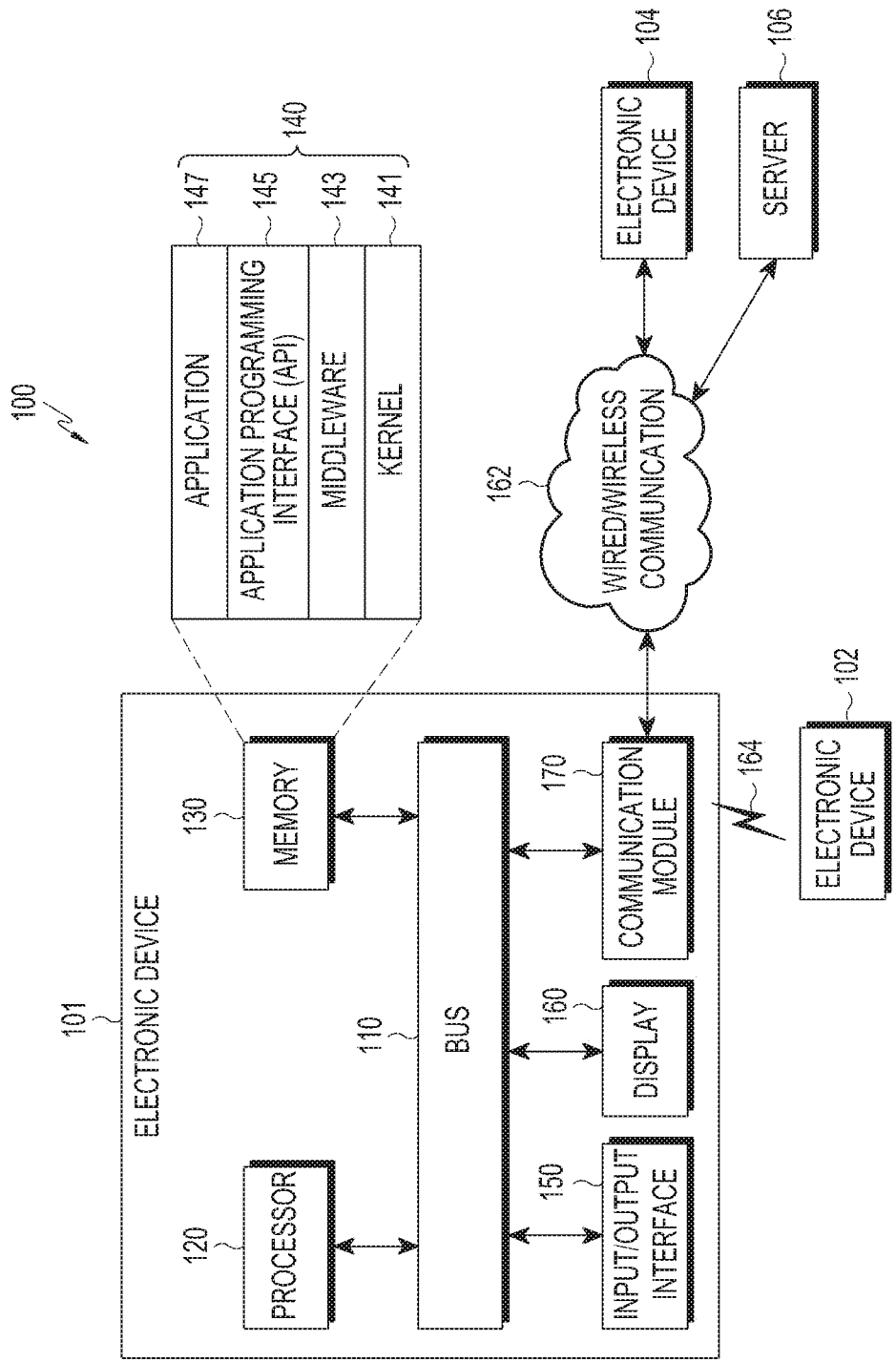
FIG. 1A is a block diagram illustrating an electronic device and a network according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a", "an", and "the", include plural referents unless the context clearly dictates otherwise. Thus, for example, reference to "a component surface" includes reference to one or more of such surfaces.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and/or order and are used to distinguish a component from another without limiting the components. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts. For example, the term "processor configured (or set) to perform A, B, and C" may mean a generic-purpose processor (e.g., a central processing unit (CPU) or application processor (AP)) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," "an," and "the" include plural references unless the context clearly dictates otherwise. The terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), a Moving Picture Experts Group (MPEG-1 or MPEG-2) audio layer 3 (MP3) player, a mobile medical device, a camera, or a wearable device. According to an embodiment of the present disclosure, the wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device (e.g., an implantable circuit).

According to an embodiment of the present disclosure, the electronic device may be a home appliance. For example, examples of the smart home appliance may include at least one of a television (TV), a digital versatile disc (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™) a gaming console (Xbox™, PlayStation™), an electronic dictionary, an electronic key, a camcorder, or an electronic picture frame.

According to an embodiment of the present disclosure, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or Internet of Things devices (e.g., a bulb, various sensors, an electric or gas meter, a sprinkler, a fire alarm, a thermostat, a street light, a toaster, fitness equipment, a hot water tank, a heater, or a boiler).

According to various embodiments of the disclosure, examples of the electronic device may at least one of part of furniture or building/structure, an electronic board, an electronic signature receiving device, a projector, or various measurement devices (e.g., devices for measuring water, electricity, gas, or electromagnetic waves). According to an embodiment of the present disclosure, the electronic device may be one or a combination of the above-listed devices. According to an embodiment of the present disclosure, the electronic device may be a flexible electronic device. The electronic device disclosed herein is not limited to the above-listed devices, and may include new electronic devices depending on the development of technology.

Hereinafter, electronic devices are described with reference to the accompanying drawings, according to various embodiments of the present disclosure. As used herein, the term "user" may denote a human or another device (e.g., an artificial intelligent electronic device) using the electronic device.

FIG. 1A is a block diagram illustrating an electronic device and a network according to an embodiment of the present disclosure.

Referring to FIG. 1A, an electronic device 101 is included in a network environment 100. The electronic device 101 may include a bus 110, a processor 120, a memory 130, an input/output interface 150, a display 160, and a communication interface 170. In some embodiments of the present disclosure, the electronic device 101 may exclude at least one of the components or may add another component.

The bus 110 may include a circuit for connecting the components 110 to 170 with one another and transferring communications (e.g., control messages and/or data) between the components.

The processing module 120 may include one or more of a CPU, an AP, or a communication processor (CP). The processor 120 may perform control on at least one of the other components of the electronic device 101, and/or perform an operation or data processing relating to communication.

The memory 130 may include a volatile and/or non-volatile memory. For example, the memory 130 may store commands or data related to at least one other component of the electronic device 101. According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS).

For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example.

Further, the middleware 143 may process one or more task requests received from the application program 147 in order of priority. For example, the middleware 143 may assign at least one of application programs 147 with priority of using system resources (e.g., the bus 110, processor 120, or memory 130) of at least one electronic device 101. For example, the middleware 143 may perform scheduling or load balancing on the one or more task requests by processing the one or more task requests according to the priority assigned to the at least one application program 147.

The API 145 is an interface allowing the application 147 to control functions provided from the kernel 141 or the middleware 143. For example, the API 133 may include at least one interface or function (e.g., a command) for filing control, window control, image processing or text control.

The input/output interface 150 may serve as an interface that may, e.g., transfer commands or data input from a user or other external devices to other component(s) of the electronic device 101. Further, the input/output interface 150 may output commands or data received from other component(s) of the electronic device 101 to the user or the other external device.

The display 160 may include, e.g., a liquid crystal display (LCD), a light emitting diode (LED) display, an organic LED (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user.

For example, the communication interface 170 may set up communication between the electronic device 101 and an external electronic device (e.g., a first electronic device 102, a second electronic device 104, or a server 106). For example, the communication interface 170 may be connected with the network 162 through wireless or wired communication to communicate with the external electronic device.

The wireless communication may be a cellular communication protocol and may use at least one of, e.g., long-term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). Further, the wireless communication may include, e.g., short-range communication 164. The short-range communication 164 may include at least one of wireless fidelity (Wi-Fi), Bluetooth, near-field communication (NFC), or GNSS. The GNSS may include at least one of, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, or plain old telephone service (POTS). The network 162 may include at least one of telecommunication networks, e.g., a computer network (e.g., local area network (LAN) or wide area network (WAN)), Internet, or a telephone network.

The first and second external electronic devices 102 and 104 each may be a device of the same or a different type from the electronic device 101. According to an embodiment of the present disclosure, the server 106 may include a group of one or more servers. According to an embodiment of the present disclosure, all or some of operations executed on the electronic device 101 may be executed on another or multiple other electronic devices (e.g., the electronic devices 102 and 104 or server 106). According to an embodiment of the present disclosure, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

According to an embodiment of the present disclosure, the processor 120 may be electrically connected to the display 160. Further, the processor 120 may be electrically connected to the memory 130. The memory 130 may store instructions executed to enable the processor 120 to obtain an image, detect at least one object in a facial area from the image, and apply a virtual light source effect to the image based on an attribute of the detected object and display the image.

According to an embodiment of the present disclosure, the memory 130 may further store an instruction executed to enable the processor 120 to determine a characteristic of a virtual light source and adjust an attribute of each of at least one pixel in the image according to the virtual light source and display the image.

According to an embodiment of the present disclosure, the memory 130 may further store an instruction executed to enable the processor 120 to detect posture information on the facial area and adjust an attribute of each of at least one pixel in the image according to a position of the virtual light source adjusted based on the detected posture information and display the image.

According to an embodiment of the present disclosure, the memory 130 may further store an instruction executed to enable the processor 120 to determine the position of the light source corresponding to a second angle for radiating light at a first angle preset with respect to a front side of the facial area or determine the position of the light source at the first angle, based on the detected posture information.

According to an embodiment of the present disclosure, the memory 130 may further store an instruction executed to enable the processor 120 to adjust the attribute of each of the at least one pixel in the image and display the image according to a distance between the virtual light source and each of the at least one pixel.

According to an embodiment of the present disclosure, the memory 130 may further store an instruction executed to enable the processor 120 to determine a brightness adjustment ratio of each of the at least one pixel in the image according to the distance from the virtual light source and adjust a brightness of each of the at least one pixel in the image and display the image according to the determined brightness adjustment ratio.

According to an embodiment of the present disclosure, the memory 130 may further store an instruction executed to enable the processor 120 to adjust a brightness of each of the at least one pixel in the image and display the image based on an object attribute of the at least one object and the virtual light source.

According to an embodiment of the present disclosure, the memory 130 may further store an instruction executed to enable the processor 120 to adjust a brightness of each of the at least one pixel in the image and display the image based on at least one of a determined brightness, color, and color temperature of the virtual light source.

According to an embodiment of the present disclosure, the memory 130 may further store an instruction executed to enable the processor 120 to obtain light source information on an actual light source of the image, determine light source information on a virtual light source based on the light source information on the actual light source, and adjust an attribute of each of at least one pixel in the image according to the virtual light source and display the image.

According to an embodiment of the present disclosure, the memory 130 may further store an instruction executed to enable the processor 120 to determine each of at least one of a position, brightness, color, and color temperature of the virtual light source corresponding to each of at least one of a position, brightness, color, and color temperature of the actual light source.

According to an embodiment of the present disclosure, the memory 130 may further store an instruction executed to enable the processor 120 to analyze a histogram for a brightness of the image to obtain at least one of a position, brightness, color, and color temperature of the actual light source. According to an embodiment of the present disclosure, there may be provided one or more virtual light sources.

According to an embodiment of the present disclosure, the memory 130 may further store an instruction executed to enable the processor 120 to provide a user interface for setting light source information on the virtual light source, obtain the light source information on the virtual light source through the user interface, and adjust the attribute of each of the at least one pixel and display the image based on the obtained light source information on the virtual light source.

According to an embodiment of the present disclosure, the memory 130 may further store an instruction executed to enable the processor 120 to compare an object attribute of the at least one object with previously stored attribute information and detect the posture information according to a result of the comparison.

According to an embodiment of the present disclosure, the memory 130 may further store an instruction executed to enable the processor 120 to adjust the attribute of each of the at least one pixel and display the image according to correlation information between the posture information and pixel attribute adjustment information.

According to an embodiment of the present disclosure, the memory 130 may further store instructions executed to enable the processor 120 to obtain an image, detect an interested area from the image, and adjust an attribute of each of at least one pixel of the interested area and display the image based on a result of the detection of at least one object in the detected interested area.

Figure 1B:
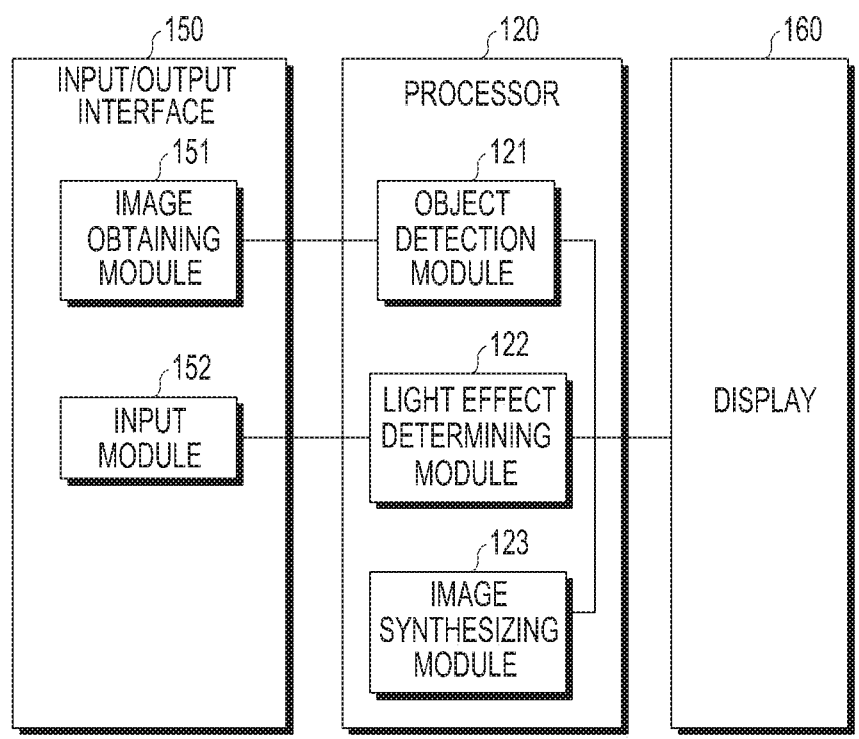
FIG. 1B is a block diagram illustrating an electronic device according to an embodiment of the present disclosure.

FIG. 1B is a block diagram illustrating an electronic device according to an embodiment of the present disclosure.

Referring to FIG. 1B, the processor 120 may be connected with each of the input/output interface 150 and the display 160. The input/output interface 150 may include an image obtaining module 151 and an input module 152. The image obtaining module 151 may obtain an image of an object for image capturing (e.g., a face). The image obtaining module 151 may include an image processing module. The image processing module may process an image obtained by a camera into an image proper for recognition (e.g., increasing contrast), into an image proper for filming or image capturing (processing noise or sharpness), or into an effect-applied image (e.g., face slender or skin whitening effect). The input module 152 may be a module for inputting additional information necessary for determining a light source effect and may include a touchscreen, a pen, a gyro sensor, an acceleration sensor, or an illumination sensor.

The processor 120 may include an object detection module 121, a light effect determining module 122, and an image synthesizing module 123. The object detection module 121 may detect at least one of the position and size of an object (eye, nose, or mouth) on the face. The light effect determining module 122 may determine the attribute of a virtual light source. According to an embodiment of the present disclosure, the light effect determining module 122 may include a face detection/analysis module that may detect the position and size of the face in the processed image and performs analysis to extract the angle of face by analyzing the result of detection of the object or the features of the face. According to an embodiment of the present disclosure, the light effect determining module 122 may include an ambient light source analysis module that may analyze (e.g., histogram) the size and distribution of pixel information (brightness or color) of at least a portion (e.g., windows arranged at a predetermined interval) of the image to estimate the color temperature of light source in the current scene, strength of light source, and position of light source. According to an embodiment of the present disclosure, the light effect determining module 122 may include a virtual light source parameter determining module that may determine or edit the characteristics (e.g., position, strength, or color) of the virtual light source. The image synthesizing module 123 may synthesize the current image and an additionally generated light source effect in real-time. The display 160 may display the synthesized image.

Figure 2:
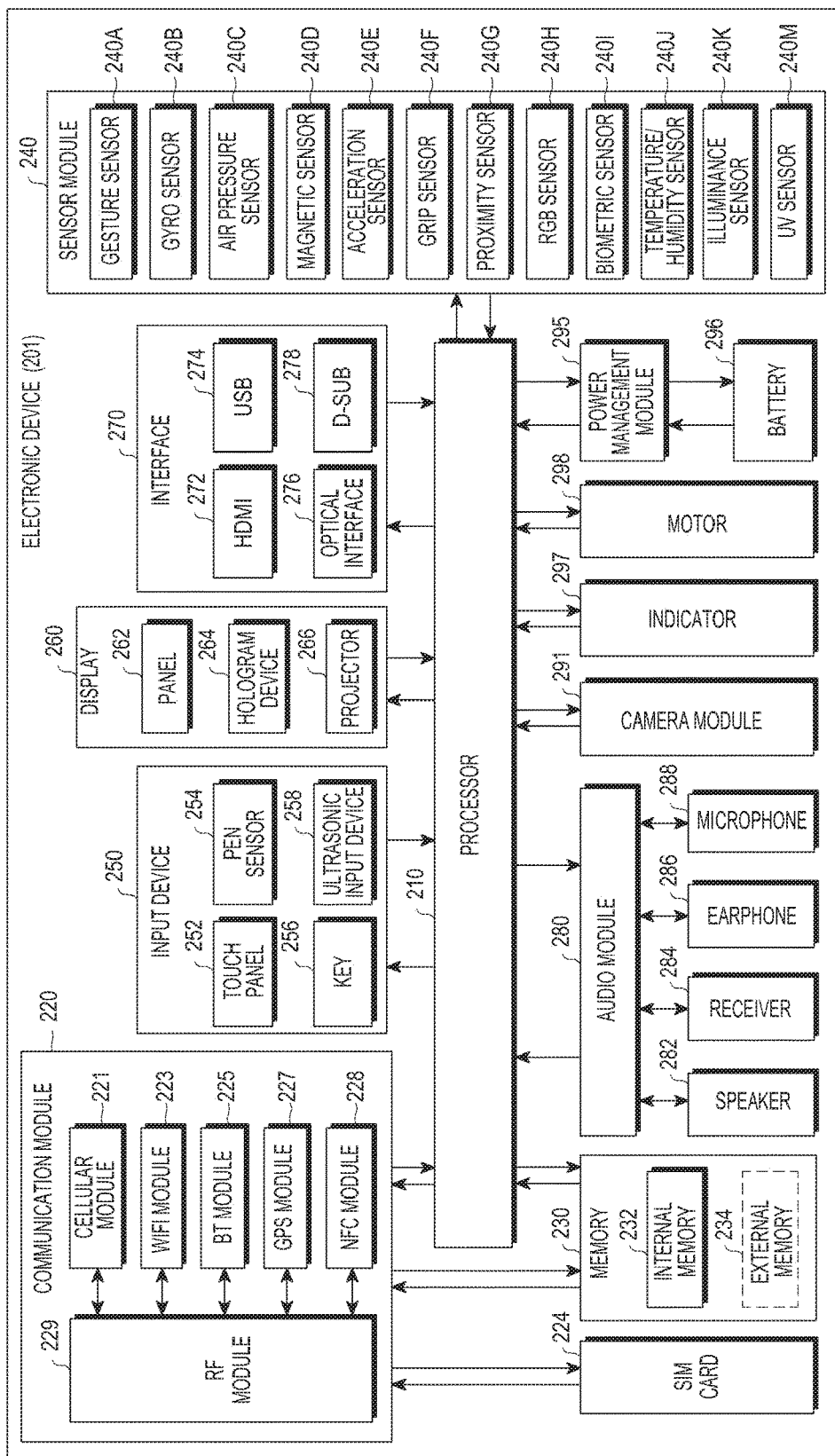
FIG. 2 is a block diagram illustrating an electronic device according to an embodiment of the present disclosure.

FIG. 2 is a block diagram illustrating an electronic device according to an embodiment of the present disclosure.

Referring to FIG. 2, an electronic device 201 may include the whole or part of the configuration of, e.g., the electronic device 101 shown in FIGS. 1A and 1B. The electronic device 201 may include one or more processors (e.g., APs) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control multiple hardware and software components connected to the processor 210 by running, e.g., an OS or application programs, and the processor 210 may process and compute various data. The processor 210 may be implemented in, e.g., a system on chip (SoC). According to an embodiment of the present disclosure, the processor 210 may further include a graphic processing unit (GPU) and/or an image signal processor (ISP). The processor 210 may include at least some (e.g., a cellular module 221) of the components shown in FIG. 2. The processor 210 may load a command or data received from at least one of other components (e.g., a non-volatile memory) on a volatile memory, process the command or data, and store various data in the non-volatile memory.

The communication module 220 may have the same or similar configuration to the communication interface 170 of FIG. 1. The communication module 220 may include, e.g., a cellular module 221, a Wi-Fi module 223, a Bluetooth module 225, a GNSS module 227 (e.g., a GPS module, a Glonass module, a Beidou module, or a Galileo module), an NFC module 228, and a radio frequency (RF) module 229.

The cellular module 221 may provide voice call, video call, text, or Internet services through, e.g., a communication network. The cellular module 221 may perform identification or authentication on the electronic device 201 in the communication network using a SIM 224 (e.g., the SIM card). According to an embodiment of the present disclosure, the cellular module 221 may perform at least some of the functions providable by the processor 210. According to an embodiment of the present disclosure, the cellular module 221 may include a CP.

The Wi-Fi module 223, the Bluetooth module 225, the GNSS module 227, or the NFC module 228 may include a process for, e.g., processing data communicated through the module. At least some (e.g., two or more) of the cellular module 221, the Wi-Fi module 223, the Bluetooth module 225, the GNSS module 227, or the NFC module 228 may be included in a single integrated circuit (IC) or an IC package.

The RF module 229 may communicate data, e.g., communication signals (e.g., RF signals). The RF module 229 may include, e.g., a transceiver, a power amplifier module (PAM), a frequency filter, a low noise amplifier (LNA), or an antenna. According to an embodiment of the present disclosure, at least one of the cellular module 221, the Wi-Fi module 223, the Bluetooth module 225, the GNSS module 227, or the NFC module 228 may communicate RF signals through a separate RF module.

The subscription identification module 224 may include, e.g., a card including a SIM and/or an embedded SIM, and may contain unique identification information (e.g., an integrated circuit card identifier (ICCID) or subscriber information (e.g., an international mobile subscriber identity (IMSI)).

The memory 230 (e.g., the memory 130) may include, e.g., an internal memory 232 or an external memory 234. The internal memory 232 may include at least one of, e.g., a volatile memory (e.g., a dynamic random access memory (DRAM), a static RAM (SRAM), a synchronous dynamic RAM (SDRAM), etc.) or a non-volatile memory (e.g., a one-time programmable read only memory (OTPROM), a PROM, an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD).

The external memory 234 may include a flash drive, e.g., a compact flash (CF) memory, a secure digital (SD) memory, a micro-SD memory, a mini-SD memory, an extreme digital (xD) memory, a multi-media card (MMC), or a memory Stick™. The external memory 234 may be functionally and/or physically connected with the electronic device 201 via various interfaces.

For example, the sensor module 240 may measure a physical quantity or detect an operational state of the electronic device 201, and the sensor module 240 may convert the measured or detected information into an electrical signal. The sensor module 240 may include at least one of, e.g., a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., an red-green-blue (RGB) sensor, a bio sensor 240I, a temperature/humidity sensor 240J, an illumination sensor 240K, or an ultra violet (UV) sensor 240M. Additionally or alternatively, the sensing module 240 may include, e.g., an E-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. According to an embodiment of the present disclosure, the electronic device 201 may further include a processor configured to control the sensor module 240 as part of the processor 210 or separately from the processor 210, and the electronic device 2701 may control the sensor module 240 while the processor 210 is in a sleep mode.

The input unit 250 may include, e.g., a touch panel 252, a (digital) pen sensor 254, a key 256, or an ultrasonic input device 258. The touch panel 252 may use at least one of capacitive, resistive, infrared, or ultrasonic methods. The touch panel 252 may further include a control circuit. The touch panel 252 may further include a tactile layer and may provide a user with a tactile reaction.

The (digital) pen sensor 254 may include, e.g., a part of a touch panel or a separate sheet for recognition. The key 256 may include e.g., a physical button, optical key or key pad. The ultrasonic input device 258 may sense an ultrasonic wave generated from an input tool through a microphone (e.g., the microphone 288) to identify data corresponding to the sensed ultrasonic wave.

The display 260 (e.g., the display 160) may include a panel 262, a hologram device 264, or a projector 266. The panel 262 may have the same or similar configuration to the display 160 of FIGS. 1A and 1B. The panel 262 may be implemented to be flexible, transparent, or wearable. The panel 262 may also be incorporated with the touch panel 252 in a module. The hologram device 264 may make three dimensional (3D) images (holograms) in the air by using light interference. The projector 266 may display an image by projecting light onto a screen. The screen may be, for example, located inside or outside of the electronic device 201. In accordance with an embodiment of the present disclosure, the display 260 may further include a control circuit to control the panel 262, the hologram device 264, or the projector 266.

The interface 270 may include e.g., an HDMI 272, a USB 274, an optical interface 276, or a D-subminiature (D-sub) 278. The interface 270 may be included in e.g., the communication interface 170 shown in FIGS. 1A and 1B. Additionally or alternatively, the interface 270 may include a mobile high-definition link (MHL) interface, a SD card/multimedia card (MMC) interface, or IrDA standard interface.

The audio module 280 may convert a sound into an electric signal or vice versa, for example. At least a part of the audio module 280 may be included in e.g., the input/output interface 145 as shown in FIGS. 1A and 1B. The audio module 280 may process sound information input or output through e.g., a speaker 282, a receiver 284, an earphone 286, or a microphone 288.

For example, the camera module 291 may be a device for capturing still images and videos, and may include, according to an embodiment of the present disclosure, one or more image sensors (e.g., front and back sensors), a lens, an ISP, or a flash such as an LED or xenon lamp.

The power manager module 295 may manage power of the electronic device 201, for example. Although not shown, according to an embodiment of the present disclosure, the power manager module 295 may include a power management integrated circuit (PMIC), a charger IC, or a battery or fuel gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery or a solar battery.

The indicator 297 may indicate a particular state of the electronic device 201 or a part (e.g., the processor 210) of the electronic device, including e.g., a booting state, a message state, or recharging state. The motor 298 may convert an electric signal to a mechanical vibration and may generate a vibrational or haptic effect. Although not shown, a processing unit for supporting mobile TV, such as a GPU may be included in the electronic device 201. The processing unit for supporting mobile TV may process media data conforming to a standard for digital multimedia broadcasting (DMB), digital video broadcasting (DVB), or mediaFlo™.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components.

Figure 3:
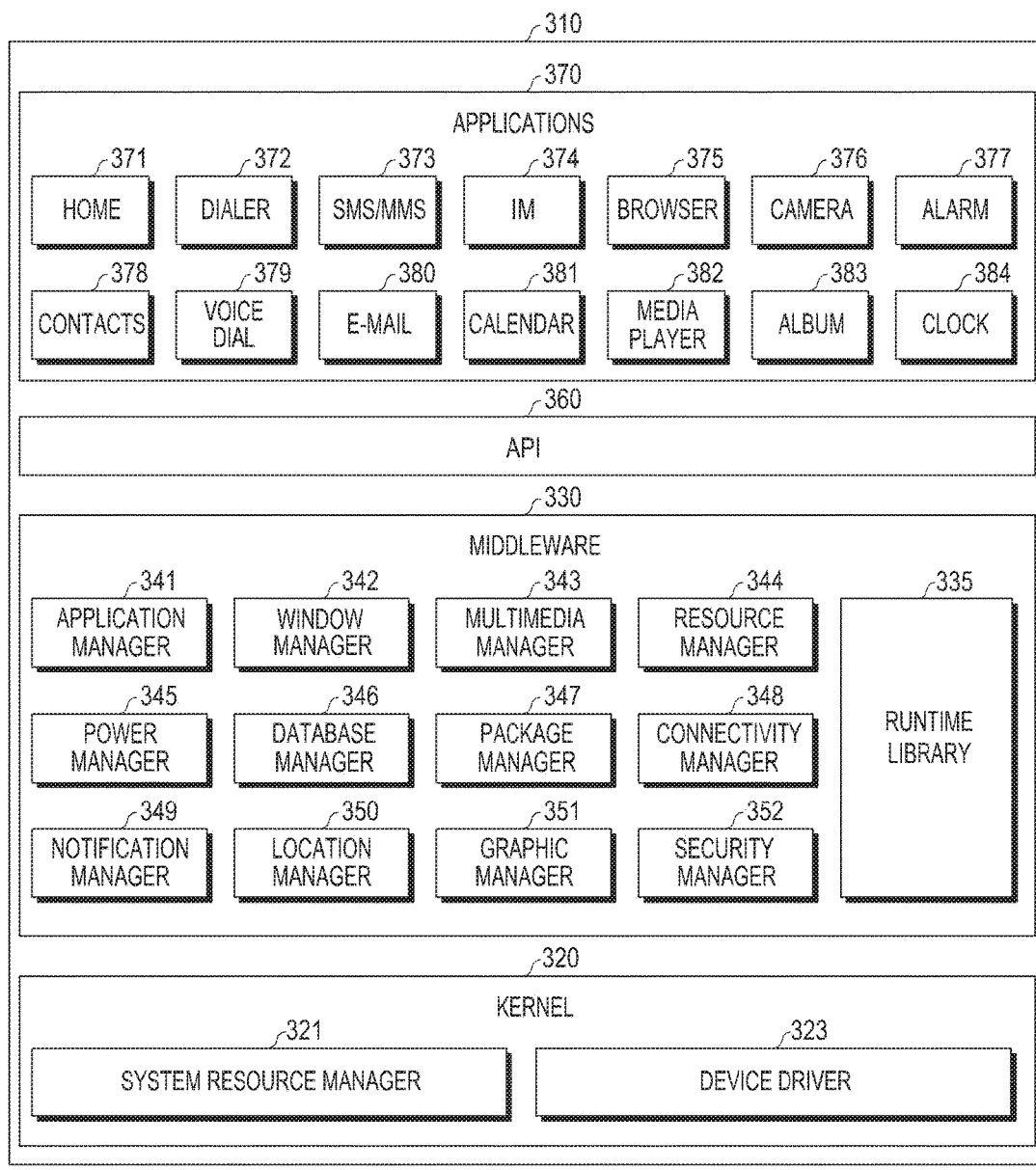
FIG. 3 is a block diagram illustrating a program module according to an embodiment of the present disclosure.

FIG. 3 is a block diagram illustrating a program module according to an embodiment of the present disclosure.

Referring to FIG. 3, a program module 310 (e.g., the program 140) may include an OS controlling resources related to the electronic device (e.g., the electronic device 101) and/or various applications (e.g., the application processor 147) driven on the OS. The OS may include, e.g., Android, iOS, Windows, Symbian, Tizen, or Bada.

The program 310 may include, e.g., a kernel 320, middleware 330, an API 360, and/or an application 370. At least a part of the program module 310 may be preloaded on the electronic device or may be downloaded from an external electronic device (e.g., the electronic devices 102 and 104 or server 106).

The kernel 320 (e.g., the kernel 141) may include, e.g., a system resource manager 321 and/or a device driver 323. The system resource manager 321 may perform control, allocation, or recovery of system resources. According to an embodiment of the present disclosure, the system resource manager 321 may include a process managing unit, a memory managing unit, or a file system managing unit. The device driver 323 may include, e.g., a display driver, a camera driver, a Bluetooth driver, a shared memory driver, a USB driver, a keypad driver, a Wi-Fi driver, an audio driver, or an inter-process communication (IPC) driver.

The middleware 330 may provide various functions to the application 370 through the API 360 so that the application 370 may efficiently use limited system resources in the electronic device or provide functions jointly required by applications 370. According to an embodiment of the present disclosure, the middleware 330 (e.g., middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module used by a compiler in order to add a new function through a programming language while, e.g., the application 370 is being executed. The runtime library 335 may perform input/output management, memory management, or operation on arithmetic functions.

The application manager 341 may manage the life cycle of at least one application of, e.g., the applications 370. The window manager 342 may manage graphical user interface (GUI) resources used on the screen. The multimedia manager 343 may grasp formats necessary to play various media files and use a codec appropriate for a format to perform encoding or decoding on media files. The resource manager 344 may manage resources, such as source code of at least one of the applications 370, memory or storage space.

The power manager 345 may operate together with, e.g., a basic input/output system (BIOS) to manage battery or power and provide power information necessary for operating the electronic device. The database manager 346 may generate, search, or vary a database to be used in at least one of the applications 370. The package manager 347 may manage installation or update of an application that is distributed in the form of a package file.

The connectivity manager 348 may manage wireless connectivity, such as, e.g., Wi-Fi or Bluetooth. The notification manager 349 may display or notify an event, such as a coming message, appointment, or proximity notification, of the user without interfering with the user. The location manager 350 may manage locational information on the electronic device. The graphic manager 351 may manage graphic effects to be offered to the user and their related user interface. The security manager 352 may provide various security functions necessary for system security or user authentication. According to an embodiment of the present disclosure, when the electronic device (e.g., the electronic device 101) has telephony capability, the middleware 330 may further include a telephony manager for managing voice call or video call functions of the electronic device.

The middleware 330 may include a middleware module forming a combination of various functions of the above-described components. The middleware 330 may be provided a specified module per type of the OS in order to provide a differentiated function. Further, the middleware 330 may dynamically omit some existing components or add new components.

The API 360 (e.g., the API 145) may be a set of, e.g., API programming functions and may have different configurations depending on OSs. For example, in the case of Android or iOS, one API set may be provided per platform, and in the case of Tizen, two or more API sets may be offered per platform.

The application 370 (e.g., the application processor 147) may include one or more applications that may provide functions such as, e.g., a home 371, a dialer 372, a short message service (SMS)/multimedia messaging service (MMS) 373, an instant message (IM) 374, a browser 375, a camera 376, an alarm 377, a contact 378, a voice dial 379, an email 380, a calendar 381, a media player 382, an album 383, or a clock 384, a health-care (e.g., measuring the degree of workout or blood sugar), or provision of environmental information (e.g., provision of air pressure, moisture, or temperature information).

According to an embodiment of the present disclosure, the application 370 may include an application (hereinafter, "information exchanging application" for convenience) supporting information exchange between the electronic device (e.g., the electronic device 101) and an external electronic device (e.g., the electronic devices 102 and 104). Examples of the information exchange application may include, but is not limited to, a notification relay application for transferring specific information to the external electronic device, or a device management application for managing the external electronic device.

For example, the notification relay application may include a function for relaying notification information generated from other applications of the electronic device (e.g., the SMS/MMS application, email application, health-care application, or environmental information application) to the external electronic device (e.g., the electronic devices 102 and 104). Further, the notification relay application may receive notification information from, e.g., the external electronic device and may provide the received notification information to the user.

The device management application may perform at least some functions of the external electronic device (e.g., the electronic device 102 or 104) communicating with the electronic device (for example, turning on/off the external electronic device (or some components of the external electronic device) or control of brightness (or resolution) of the display), and the device management application may manage (e.g., install, delete, or update) an application operating in the external electronic device or a service (e.g., call service or message service) provided from the external electronic device.

According to an embodiment of the present disclosure, the application 370 may include an application (e.g., a health-care application of a mobile medical device) designated according to an attribute of the external electronic device (e.g., the electronic devices 102 and 104). According to an embodiment of the present disclosure, the application 370 may include an application received from the external electronic device (e.g., the server 106 or electronic devices 102 and 104). According to an embodiment of the present disclosure, the application 370 may include a preloaded application or a third party application downloadable from a server. The names of the components of the program module 310 according to the shown embodiment may be varied depending on the type of OS.

According to an embodiment of the present disclosure, at least a part of the program module 310 may be implemented in software, firmware, hardware, or in a combination of two or more thereof. At least a part of the programming module 310 may be implemented (e.g., executed) by e.g., a processor (e.g., the processor 210). At least a part of the program module 310 may include e.g., a module, program, routine, set of instructions, process, or the like for performing one or more functions.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of application specific integrated circuit (ASIC) chips, field programmable gate arrays (FPGAs), or programmable logic arrays (PLAs) that perform some operations, which have already been known or will be developed in the future.

According to an embodiment of the present disclosure, at least a part of the device (e.g., modules or their functions) or method (e.g., operations) may be implemented as instructions stored in a computer-readable storage medium e.g., in the form of a program module. The instructions, when executed by a processor (e.g., the processor 120), may enable the processor to carry out a corresponding function. The computer-readable storage medium may be e.g., the memory 130.

The computer-readable storage medium may include a hardware device, such as hard discs, floppy discs, and magnetic tapes (e.g., a magnetic tape), optical media such as compact disc ROMs (CD-ROMs) and DVDs, magneto-optical media such as floptical disks, ROMs, RAMs, Flash Memories, and/or the like. Examples of the program instructions may include not only machine language codes but also high-level language codes which are executable by various computing means using an interpreter. The aforementioned hardware devices may be configured to operate as one or more software modules to carry out embodiments of the present disclosure, and vice versa.

Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, simultaneously, repeatedly, or heuristically. Furthermore, some of the operations may be performed in a different order, or omitted, or include other additional operation(s). The embodiments disclosed herein are proposed for description and understanding of the disclosed technology and does not limit the scope of the present disclosure. Accordingly, the scope of the present disclosure should be interpreted as including all changes or various embodiments based on the technical spirit of the present disclosure.

Figure 4:
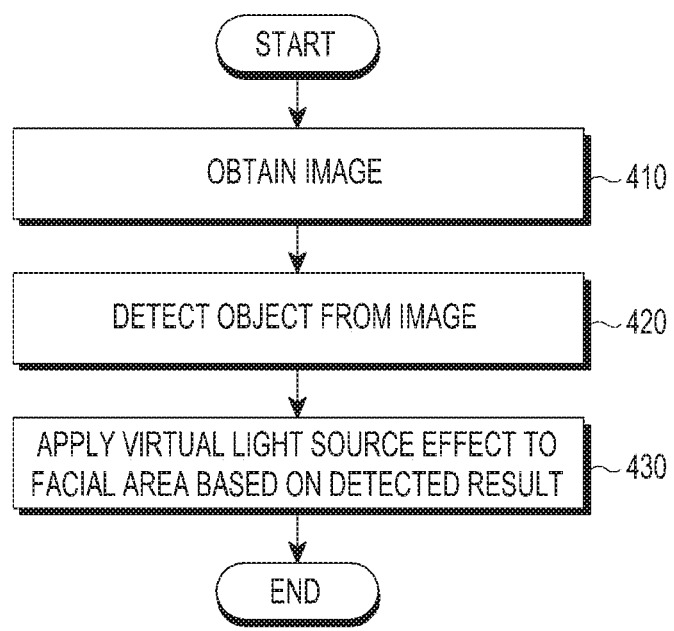
FIG. 4 is a flowchart illustrating a method for controlling an electronic device according to an embodiment of the present disclosure.

FIG. 4 is a flowchart illustrating a method for controlling an electronic device according to an embodiment of the present disclosure.

FIGS. 5A to 5E are concept views illustrating images and a process of analyzing images according to embodiments of the present disclosure.

Referring to FIG. 4, the method is described in detail with further reference to FIGS. 5A to 5D.

In operation 410, the electronic device 101 may obtain an image. For example, the electronic device 101 may image-capture a figure using a camera module included therein and obtain an image as a result of the image capturing. The electronic device 101 may also obtain an image stored in other electronic device through the communication module. The electronic device 101 may obtain the image based on various communication schemes, such as wired communication or wireless communication. Here, the image may include two-dimensional (2D) data or 3D data.

Figure 5A:
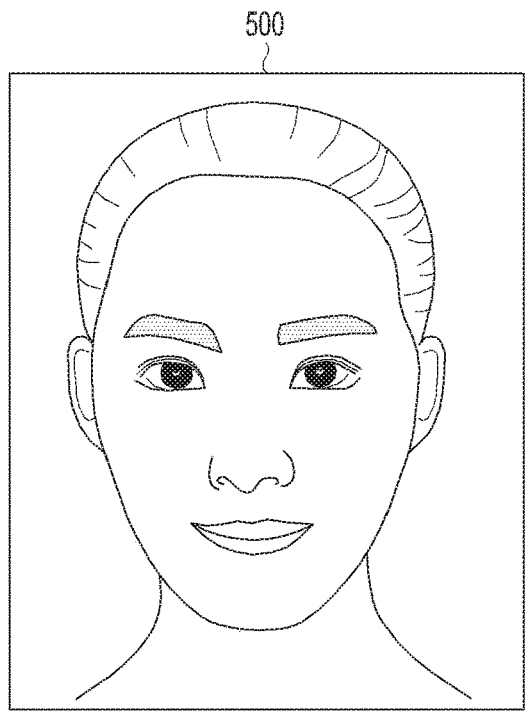
FIGS. 5A to 5E are concept views illustrating images and a process of analyzing images according to various embodiments of the present disclosure.

According to an embodiment of the present disclosure, the electronic device 101 may obtain an image 500 including the figure's face as shown in FIG. 5A, for example.

Figure 5B:
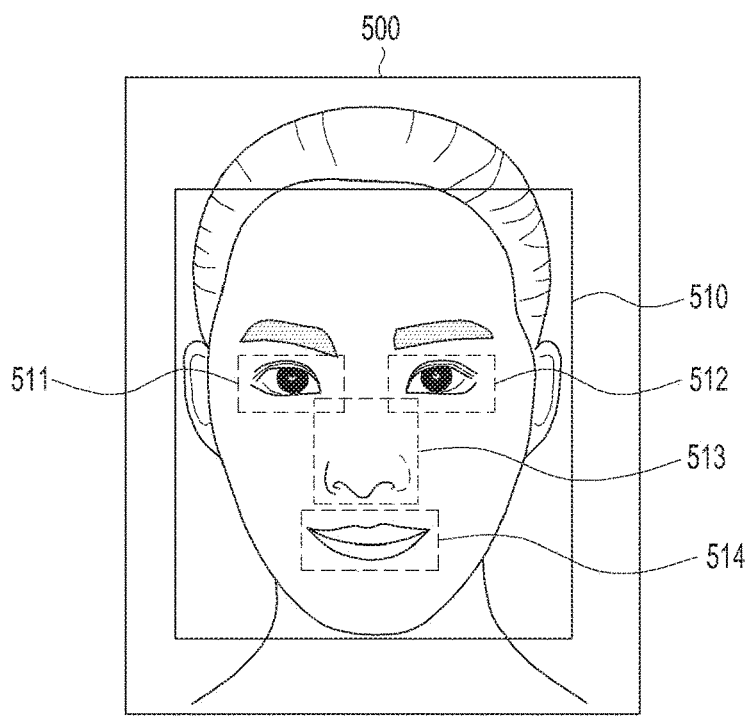

In operation 420, the electronic device 101 may detect the facial area from the image. For example, the electronic device 101 may detect a facial area 510 from the image 500 as shown in FIG. 5B. The electronic device 101 may detect the facial area 510 from the image 500 by various known schemes. According to an embodiment of the present disclosure, the electronic device 101 may detect the facial area 510 based on a feature constituting the face or a facial feature obtained by extracting a land mark from the image 500. According to an embodiment of the present disclosure, the electronic device 101 may detect the facial area 510 using various face detection algorithms, such as principal component analysis (PCA) using the eigenface, linear discriminate analysis (LDA), elastic bunch graph matching (EBGM), hidden Markov model, multilinear subspace learning and neuronal motivated dynamic link matching using tensor representation. Alternatively, the electronic device 101 may detect the facial area 510 using various face detection programs, such as a digiKam program, an iPhoto program, an OpenCV program, a photoshop elements program, a picasa program, a picture motion browser program, or a windows live photo gallery program.

According to an embodiment of the present disclosure, the electronic device 101 may detect at least one object 511, 512, 513, and 514 constituting the face. According to an embodiment of the present disclosure, the electronic device 101 may detect the at least one object 511, 512, 513, and 514 using the above-enumerated face detection algorithm or additional detection algorithm. According to an embodiment of the present disclosure, the electronic device 101 may detect the at least one object 511, 512, 513, and 514 according to various features of the detected facial area 510, such as, e.g., an edge, corner, blob, ridge, scale-invariant feature, or color. According to an embodiment of the present disclosure, the electronic device 101 may determine that the detected objects 511 and 512 are eyes, the detected object 513 is a nose, and the detected object 514 is a mouth.

According to an embodiment of the present disclosure, the electronic device 101 may previously store the object attributes. For example, the electronic device 101 may store the relation between object and object attribute as shown in the following Table 1.

TABLE 1

| Object | Object attribute (type) | Object attribute (protruded attribute) |
|---|---|---|
| First object | Forehead | protruding from around object to the center |
| Second object | Nose | protruding further than surrounding area |
| Third object | Mouth | protruding further than surrounding area |

The above-described types of object attributes or protruded attributes may be used for image processing on a virtual light source, which is described below in greater detail.

Figure 5C:
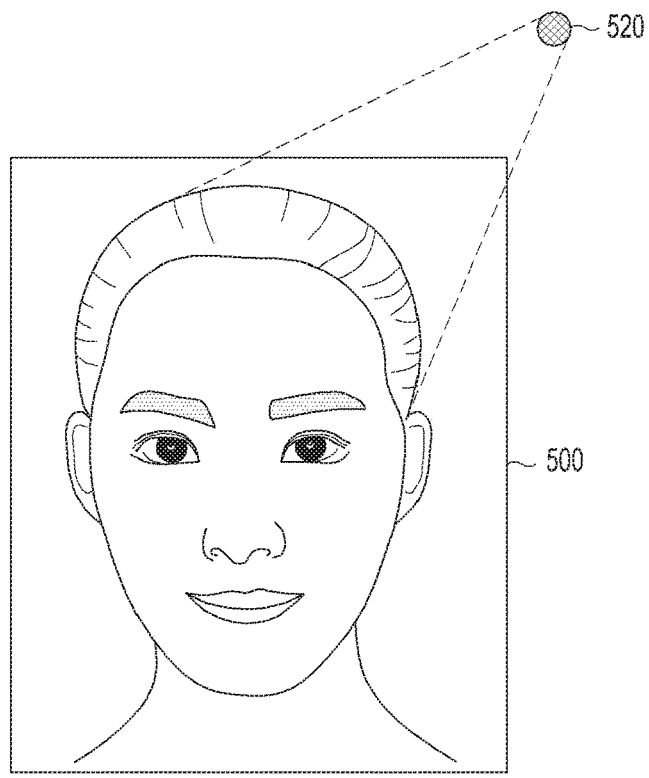

In operation 430, the electronic device 101 may apply a virtual light source effect to the facial area based on the result of detection. Here, the virtual light source effect may be an effect obtained by adjusting and displaying the attribute of each pixel in the image 500 assuming an environment where there is a virtual light source radiating light to the image 500. For example, the electronic device 101 may determine the position of a virtual light source 520 radiating light at a preset first angle to the facial area 510 as shown in FIG. 5C. According to an embodiment of the present disclosure, the electronic device 101 may determine the position of the virtual light source 520 for the facial area 510. According to an embodiment of the present disclosure, the electronic device 101 may immediately apply the effect by the preset virtual light source 520 without performing a process for determining the position. According to an embodiment of the present disclosure, the electronic device 101 may also adjust the attribute of pixel based on a lookup table without bringing in the concept of the virtual light source 520. According to an embodiment of the present disclosure, the lookup table may be the relation between object and adjustment rate of pixel attribute. For example, according to an embodiment of the present disclosure, the electronic device 101 may store a lookup table as shown in Table 2 below.

TABLE 2

| Object | Adjustment rate of pixel attribute |
|---|---|
| Left forehead | Brightness + 30% |
| Right forehead | Brightness − 30% |
| Nose | Brightness + 45% |
| Left cheek | Brightness + 30% |
| Right cheek | Brightness − 45% |
| Chin | Brightness − 50% |

According to an embodiment of the present disclosure, the electronic device 101 may adjust and display the attribute of pixels based on the lookup table as shown in Table 2. Table 2 may be a lookup table for the virtual light source being positioned at the first angle, and the electronic device 101 may store various lookup tables corresponding to various positions of the virtual light source. For example, Table 3 may also be a lookup table, corresponding to a second angle.

TABLE 3

| Object | Adjustment rate of pixel attribute |
|---|---|
| Left forehead | Brightness − 30% |
| Right forehead | Brightness + 30% |
| Nose | Brightness + 45% |
| Left cheek | Brightness − 30% |
| Right cheek | Brightness + 45% |
| Chin | Brightness − 50% |

For example, the electronic device 101 may apply the virtual light source effect in real-time by referencing the lookup table corresponding to the position of the virtual light source that is set by the user, previously set, or set by computation.

Referring to FIG. 5C, the virtual light source 520 is positioned at a right and upper side, and the position may be set directly by the user. Alternatively, the electronic device 101 may previously set the position of the virtual light source 520 to a position where light is radiated ideally when image capturing a figure. The electronic device 101 may also determine the position of the virtual light source 520 according to light source information on the actual light source by the ambient environment or may determine the position of the virtual light source 520 according to the posture information on the facial area 510, and this is described below in greater detail.

Figure 5D:
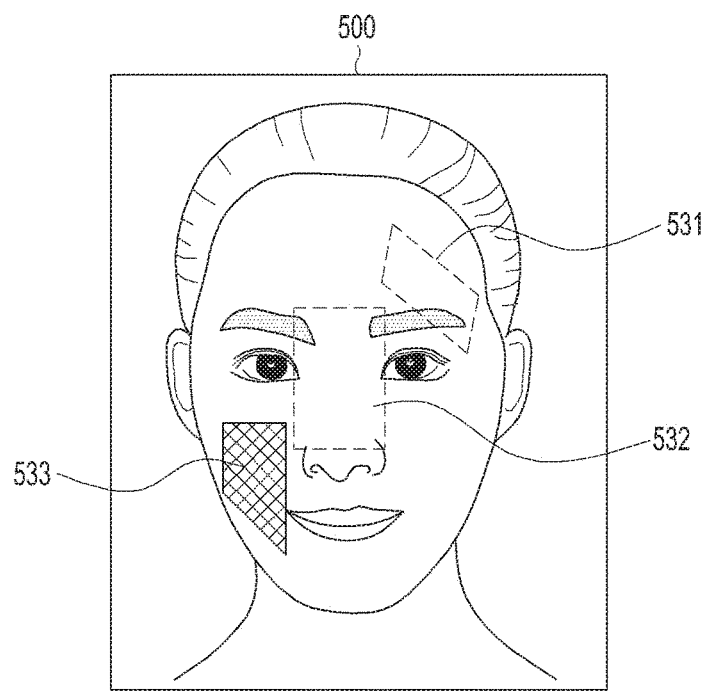

FIG. 5D illustrates an example of adjusting and displaying the attribute of pixels based on a lookup table as shown in Table 2. The electronic device 101 may display the object corresponding to a left forehead 531 to be 30% brighter than the original image. The electronic device 101 may display the object corresponding to a nose 532 to be 45% brighter than the original image. The electronic device 101 may display the object corresponding to a right cheek 533 to be 45% darker than the original image.

According to an embodiment of the present disclosure, the electronic device 101 may apply the virtual light source effect based on the object attributes as shown in Table 1. For example, the electronic device 101 may adjust the brightness of the object protruded further than around the same to be higher than the existing brightness. For example, the electronic device 101 may adjust a first area positioned closer to the virtual light source with respect to a protruding object to be brighter and a second area positioned farther than the virtual light source to be darker. Accordingly, the electronic device 101 may display the virtual light source effect-applied image using Table 1 as shown in FIG. 5D.

As described above, the electronic device 101 may adjust and display the attribute of pixels of the original image by applying the effect of the virtual light source or using the lookup table. The above-described brightness adjustment by adjusting the attribute of pixels is merely an example. According to an embodiment of the present disclosure, the electronic device 101 may adjust and display various attributes of pixels, such as color, color temperature, or chroma of pixels.

According to an embodiment of the present disclosure, the electronic device 101 may switch and display the virtual light source effect-applied image and original image by a switching command from the user so that the user may identify the difference by the virtual light source effect.

For example, the user may input a tap command to the electronic device 101, and the electronic device 101 may switch and display the virtual light source effect-applied image and the original image corresponding to the tap command. Alternatively, the electronic device 101 may provide one or more predetermined virtual light source effects, and the electronic device 101 may sequentially switch and display the virtual light source effect-applied images or configure the screen to display a collage image, and the electronic device 101 may obtain an image configured as one of the images or configured in the form of a combination of the images in response to an input from the user.

Figure 5E:
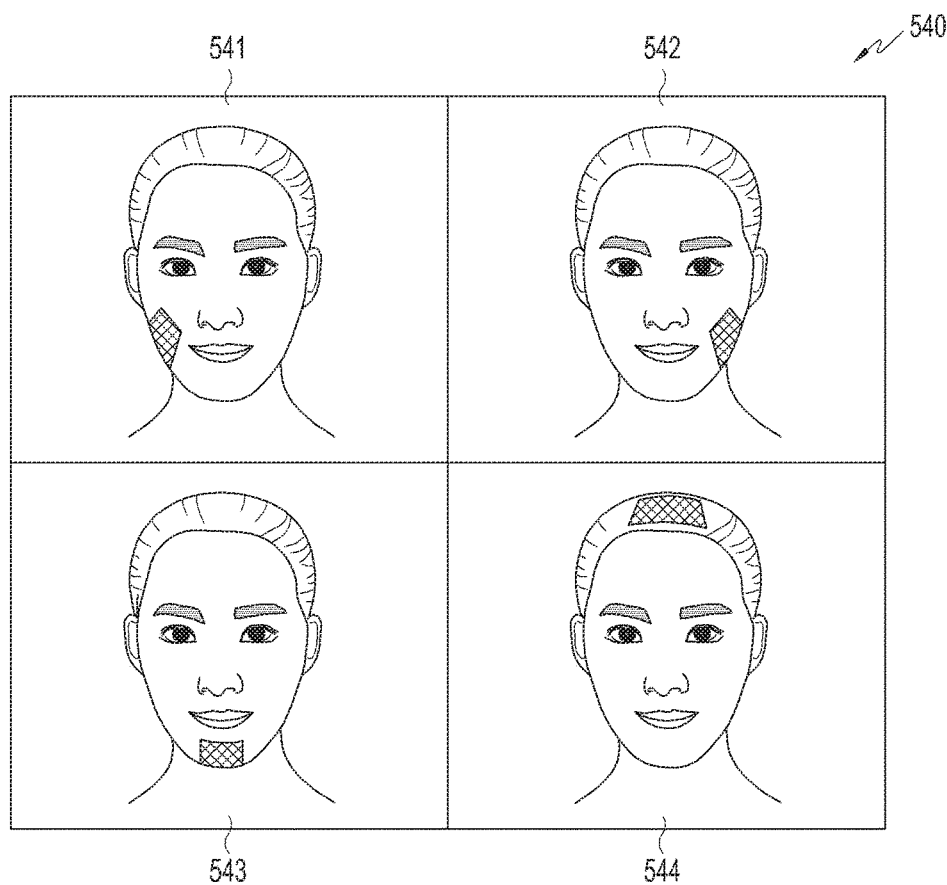

For example, referring to FIG. 5E, the electronic device 101 may display a collage image 540 obtained by combining a plurality of images 541, 542, 543, and 544 having different positions of the virtual light source. Although in the embodiment related to FIG. 5E, the collage image 540 of a plurality of images 541, 542, 543, and 544 with different positions of the virtual light source is described, this is merely an example, and according to an embodiment of the present disclosure, the electronic device 101 may also display a collage image obtained by combining a plurality of images with different attributes, e.g., different brightnesses or color temperatures of the virtual light source.

Figure 6:
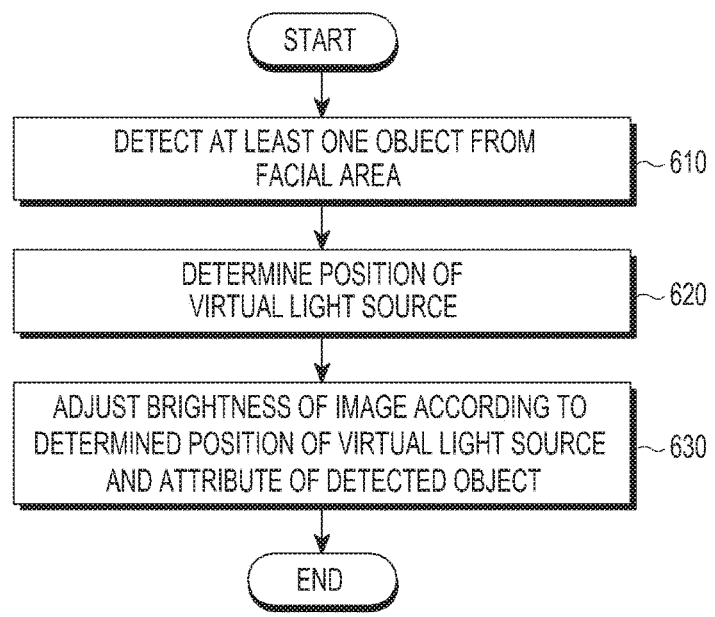
FIG. 6 is a flowchart illustrating a method for controlling an electronic device according to an embodiment of the present disclosure.

FIG. 6 is a flowchart illustrating a method for controlling an electronic device according to an embodiment of the present disclosure.

Figure 7A:
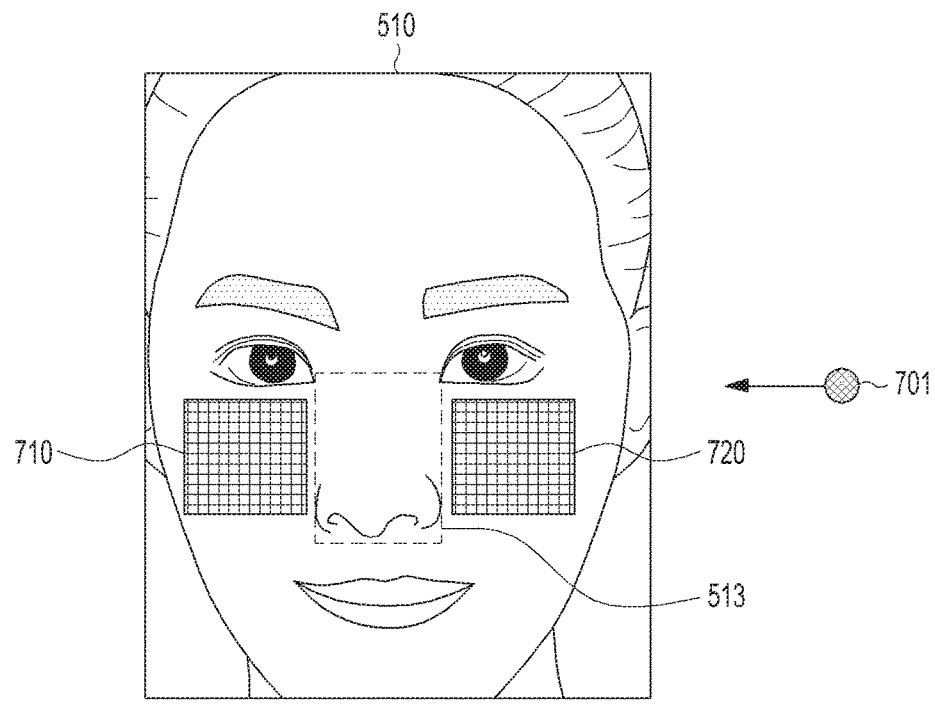
FIGS. 7A to 7C are concept views illustrating a virtual light source and facial area according to an embodiment of the present disclosure.
Figure 7B:
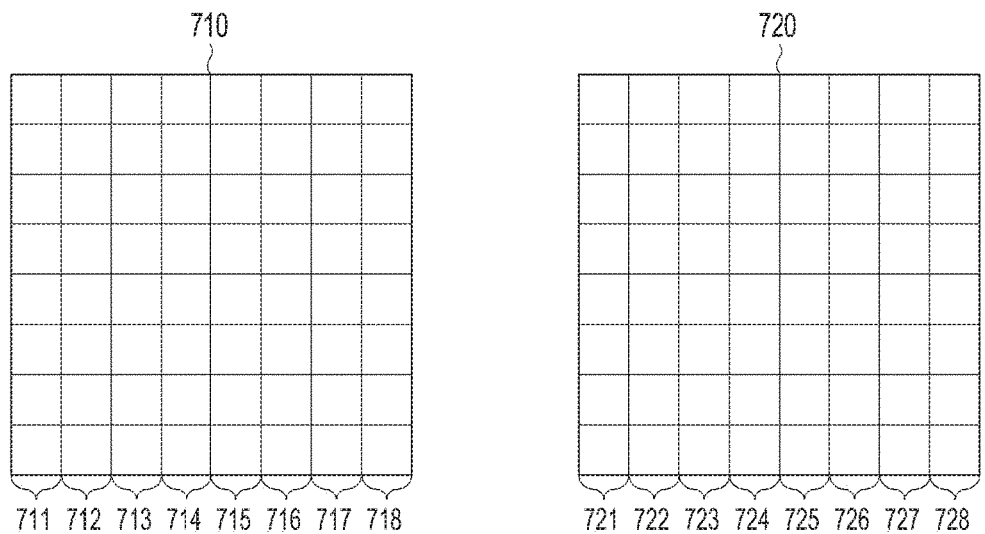
Figure 7C:
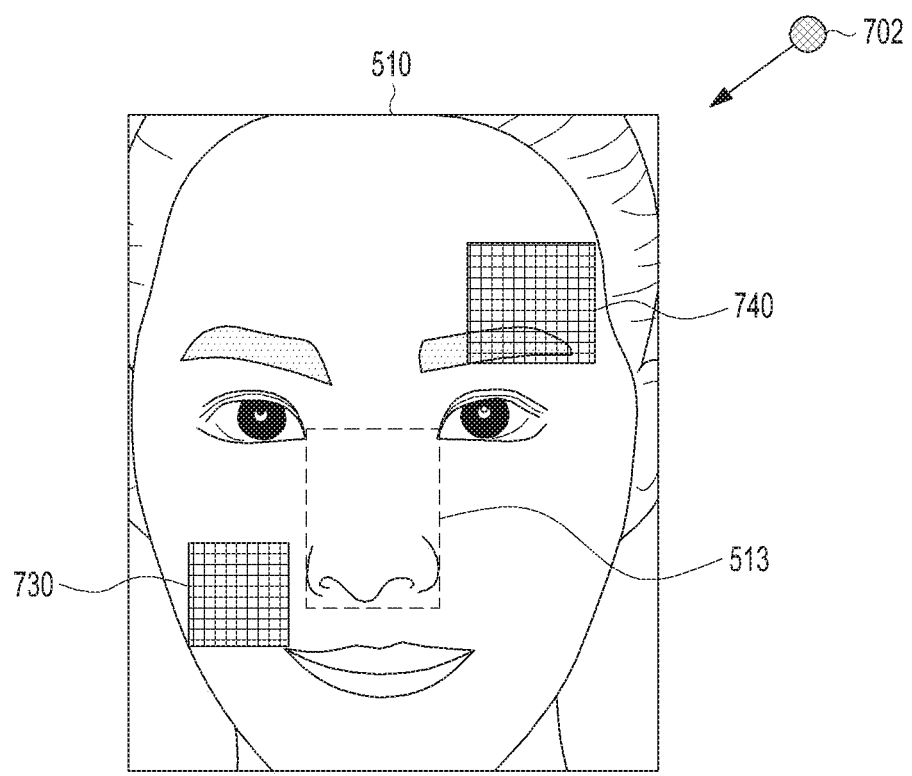

FIGS. 7A to 7C are concept views illustrating a virtual light source and facial area according to an embodiment of the present disclosure.

Referring to FIG. 6, the method is described in detail with further reference to FIGS. 7A to 7C.

In operation 610, the electronic device 101 may detect at least one object from a facial area. Here, the at least one object may be an object constituting the face, and for example, the electronic device 101 may detect the nose object 513 from the facial area 510 as shown in FIG. 7A. As described above, the electronic device 101 may detect the object constituting the face using a face detection algorithm or an additional detection algorithm. For example, the electronic device 101 may detect the object constituting the face according to the positional relation between objects in the result of face detection. The electronic device 101 may also detect the object constituting the face according to the positional relation between the face contour and object. The electronic device 101 may also detect the object constituting the face by comparing at least one feature with previously stored feature information to determine at least one of type and protruded attribute. For example, the electronic device 101 may determine whether the object corresponds to the mouth, left cheek, right cheek, left forehead, or right forehead.

In operation 620, the electronic device 101 may determine the position of the virtual light source. As set forth above, in an embodiment of the present disclosure, the electronic device 101 may obtain a virtual light source position command from the user and determine the position of the virtual light source corresponding to the command. According to an embodiment of the present disclosure, the electronic device 101 may previously set the position of the virtual light source, and in this case, the position of the virtual light source may be a position where light may be radiated at a preferably set angle to the figure. The electronic device 101 may also determine the position of the virtual light source based on at least one of light source information on the actual light source and posture information on the facial area.

For example, referring to FIG. 7A, the electronic device 101 may determine that a virtual light source 701 is positioned relatively at a right side with respect to the image. Although FIG. 7A illustrates that the virtual light source 701 is positioned on a plane, this is merely for the purpose of illustration, and the electronic device 101 may determine the position of the virtual light source 701 in a 3D space, which is described below in greater detail. In the embodiment related to FIG. 7A, the electronic device 101 may place the virtual light source 701 at the position (x1,y1,z1) in the 3D spherical coordinate system configured with respect to the nose object 513 on the plane of the facial area 510.

In operation 630, the electronic device 101 may adjust and display the attribute of pixels of the image according to the determined position of the virtual light source and detected object attribute. The electronic device 101 may detect a right cheek object 710 and a left cheek object 720. The electronic device 101 may process each of the right cheek object 710 and the left cheek object 720 in pixel units. For example, as shown in FIG. 7B, the electronic device 101 may process the right cheek object 710 in units of pixels 711 to 718 and 721 to 728. For example, the electronic device 101 may display the pixels 711 to 718 of the right cheek object 710 to be darker than the original image. Further, the electronic device 101 may display the pixels 721 to 728 of the left cheek object 720 to be darker than the original image.

According to an embodiment of the present disclosure, the electronic device 101 may adjust and display the brightness depending on the distance between the light source 701 and pixel. Specifically, the electronic device 101 may set the brightness adjustment rate of pixels corresponding to the left cheek object 720 to be larger for the pixel 728 positioned closer to the light source 701 than for the pixel 721 positioned relatively farther from the light source 701.

The electronic device 101 may apply the light source effect to the whole facial area 510, and the electronic device 101 may alternatively determine a partial area where the light source effect is to apply and apply the light source effect to only the partial area. In an embodiment of the present disclosure, the electronic device 101 may apply the light source effect to an area corresponding to a straight line connecting the nose object 713 with a point obtained by projecting light from the virtual light source 701 to a plane including the facial area 510, e.g., the xy plane, e.g., the right cheek object 710 and the left cheek object 720 as shown in FIG. 7B. The electronic device 101 may also adjust and display an area corresponding to the line connecting the virtual light source 701 with the nose object 713 and an extension line, e.g., the right cheek object 710 and the left cheek object 720 of FIG. 7B, to be much brighter than other areas. That is, the electronic device 101 may adjust and display the pixel attribute depending on the relation between the position of virtual light source 710 and the position of object.

According to an embodiment of the present disclosure, the electronic device 101 may adjust and display the pixel attribute according to the protruded attribute of the cheek objects 710 and 720. For example, the electronic device 101 may grasp the attribute that the pixels positioned under the eyes of the cheek objects 710 and 720 further protrude from other points and may adjust and display the pixels positioned under the eyes to be brighter than the other pixels.

The electronic device 101 may display the nose object 713 to be brighter than the original image. The electronic device 101 may adjust to increase the brightness corresponding to the object based on the information that the facial portion corresponding to the nose object 713 is the nose. Accordingly, even without applying 3D modeling, the electronic device 101 may grasp only the object attribute and apply a light source effect complying with the real life one, according to an embodiment of the present disclosure.

FIG. 7C is a concept view illustrating a virtual light source and facial area according to an embodiment of the present disclosure. In the embodiment related to FIG. 7C, it is assumed that the virtual light source 702 is provided at a position different from that shown in FIG. 7A. The electronic device 101 may move the position of the virtual light source 702 to a point (x2,y2,z2) in the 3D coordinate system with respect to the nose object 713 according to a virtual light source move command from the user. The electronic device 101 may also vary the position of the virtual light source 702 based on at least one of posture information on the facial area and actual light source.

In the embodiment related to FIG. 7C, the electronic device 101 may determine areas 730 and 740 whose the pixels are rendered to be brighter than other areas. In an embodiment of the present disclosure, the electronic device 101 may determine the areas 730 and 740 to be adjusted to be brighter by determining an area corresponding to a straight line connecting the nose object 513 with a point obtained by projecting light from the virtual light source 702 to a plane including the facial area 510, e.g., the xy plane. Further, the electronic device 101 may adjust the brightness according to the distance between pixel and virtual light source 702. The electronic device 101 may increase the brightness of the area 740 positioned closer to the virtual light source 702 with respect to the nose object 513 than the original image and display the same, and the electronic device 101 may reduce the brightness of the area 730 positioned farther than the virtual light source 702 with respect to the nose object 513 than the original image and display the same.

Figure 8:
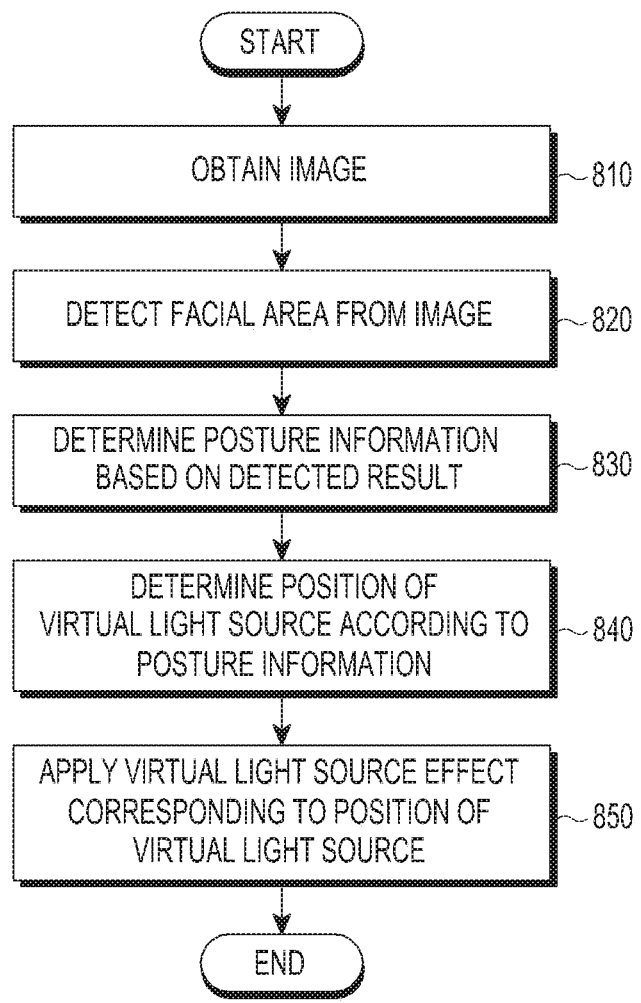
FIG. 8 is a flowchart illustrating a method for controlling an electronic device according to an embodiment of the present disclosure.

FIG. 8 is a flowchart illustrating a method for controlling an electronic device according to an embodiment of the present disclosure.

Figure 9A:
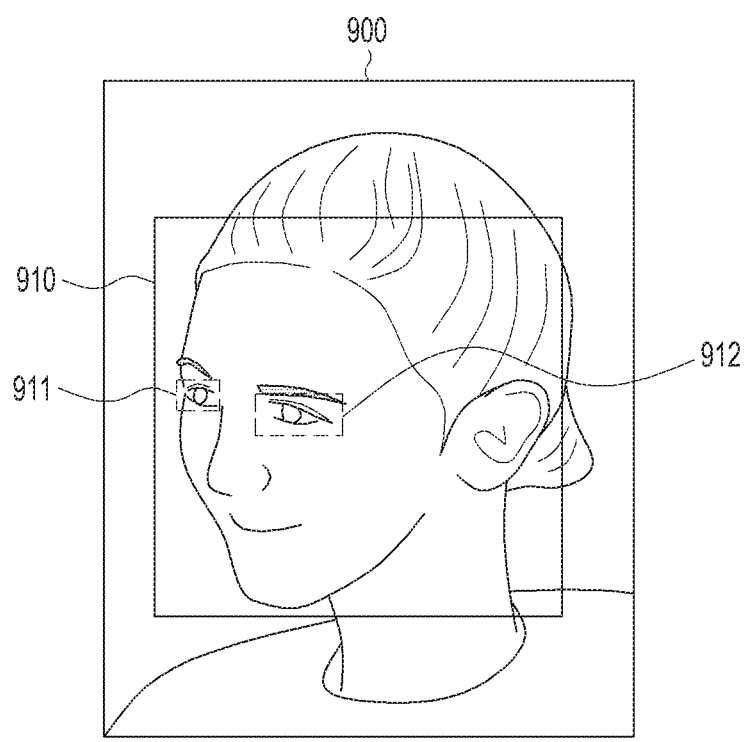
FIG. 9A is a concept view illustrating an obtained image according to an embodiment of the present disclosure.

FIG. 9A is a concept view illustrating an obtained image according to an embodiment of the present disclosure.

Figure 9B:
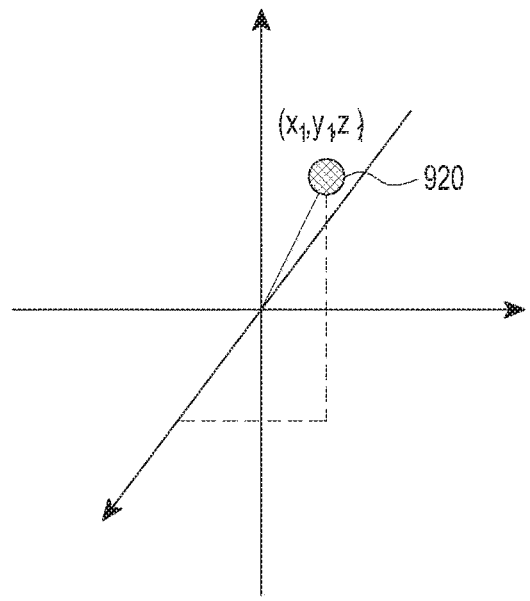
FIGS. 9B and 9C are concept views illustrating a movement of a virtual light source according to an embodiment of the present disclosure.
Figure 9C:
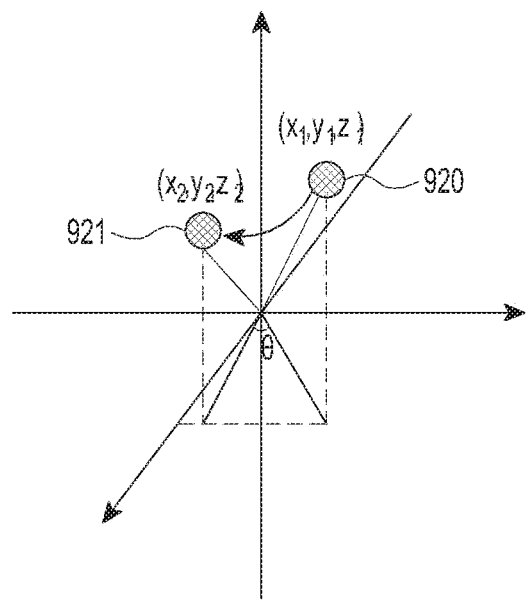

FIGS. 9B and 9C are concept views illustrating a movement of a virtual light source according to an embodiment of the present disclosure.

Referring to FIG. 8, the method is described in detail with further reference to FIGS. 9A to 9C.

In operation 810, the electronic device 101 may obtain an image. For example, the electronic device 101 may obtain an image 900 as shown in FIG. 9A.

Referring to FIG. 9A, the image 900 of FIG. 9A may be an image obtained by image-capturing a figure who has been rotated to the right with respect to the front.

In operation 820, the electronic device 101 may detect a facial area 910 from the image 900. As described above, the electronic device 101 may detect the facial area 910 based on various face detection algorithms. Further, the electronic device 101 may detect objects 911 and 912 constituting the face in the facial area 910. As described above, the electronic device 101 may detect the objects 911 and 912 constituting the face based on a face detection algorithm or an additional detection algorithm. In the embodiment related to FIG. 9A, the electronic device 101 may detect eye objects 911 and 912. According to an embodiment of the present disclosure, the electronic device 101 may detect the eye objects 911 and 912 based on the feature or color of the objects.

In operation 830, the electronic device 101 may determine posture information on the facial area based on the result of detection. According to an embodiment of the present disclosure, the electronic device 101 may detect an object, such as eye, nose, or mouth, and determine the posture information on the facial area using a geometrical relation, such as distance, angle, or area. The electronic device 101 may determine the posture information by applying a study algorithm to the posture information on the facial area. In this case, the electronic device 101 may gather a great amount of study data regarding an image captured not for the front surface but for a side surface and may design a classifier, which may distinguish the study data to the maximum, through a study scheme. The electronic device 101 may determine the posture information using a pattern detection scheme, such as neutral network or support vector machine (SVM). The posture information on the facial area is information allowing for determination as to how much the face has been rotated about the front surface, and the posture information may include at least one of, e.g., yaw, pitch, and roll.

According to an embodiment of the present disclosure, the electronic device 101 may determine the posture information on the facial area based on the upper-lower or left-right ratio of the facial area and the interval between feature points of the face.

According to an embodiment of the present disclosure, the electronic device 101 may determine the posture information by determining the feature points of the facial area. For example, when the interval between feature points in a left eye area of the face is larger than the interval between feature points in a right eye area, the electronic device 101 may determine that the left area of the face is positioned closer to the camera than the right area is and may determine that the face is oriented to the right side. Further, the electronic device 101 may analyze the shape of the T zone formed of the eyes, nose, and mouth to estimate the upper-lower direction of the face. In this case, the electronic device 101 may previously grasp the shape of T zone per person or per angle and may use the same to estimate posture information. The electronic device 101 may also estimate the rotation angle of the face using the shape of the outer line formed by the features of the face, and the position and size ratio of eye, nose, and mouth. For example, when the outer line of the forehead is broader than a chin portion, the inter-eye distance is larger than a reference value, the distance of eye/nose/mouth is smaller than a reference value, and the size of mouth is smaller than a reference value or the size and ratio in distance meet reference values, the electronic device 101 may determine that the face is oriented downward.

In operation 840, the electronic device 101 may determine the position of the virtual light source according to the posture information on the facial area. For example, the electronic device 101 may set the position of the virtual light source 920 to (x1,y1,z1) as shown in FIG. 9B. The position may be input by the user or may be a preset position. When the virtual light source 920 is positioned at (x1,y1,z1), it is assumed that light may be radiated to the facial area at a first angle. Here, the first angle may be a preset angle allowing for creation of a natural illumination effect when light is radiated to a figure at the angle and may include at least one of yaw, pitch, and roll. In embodiment related to FIG. 9A, the electronic device 101 may determine, as the posture information, the information indicating that the facial area has been rotated at a yaw θ.

As per the posture information determined in operation 830, the electronic device 101 may adjust the position of the virtual light source 920. For example, the electronic device 101 may adjust the position of the virtual light source 920 that light may be radiated to the facial area at the first angle. As shown in FIG. 9C, the electronic device 101 may determine the adjusted position (x2,y2,z2) of the virtual light source 921. In the embodiment related to FIG. 9C, the electronic device 101 may obtain the position (x2,y2,z2) of the virtual light source 921 adjusted by rotating the virtual light source 920 at yaw θ, corresponding to the posture information, i.e., rotation at yaw θ. In operation 850, the electronic device 101 may apply a virtual light source effect corresponding to the position of the virtual light source. Accordingly, the electronic device 101 may also apply the virtual light source effect to an image captured in a position rotated with respect to the front.

In another embodiment of the present disclosure, the electronic device 101 may adjust the pixel attribute of image and display the same based on the lookup table corresponding to the light source information on the moved virtual light source 920.

Figure 10:
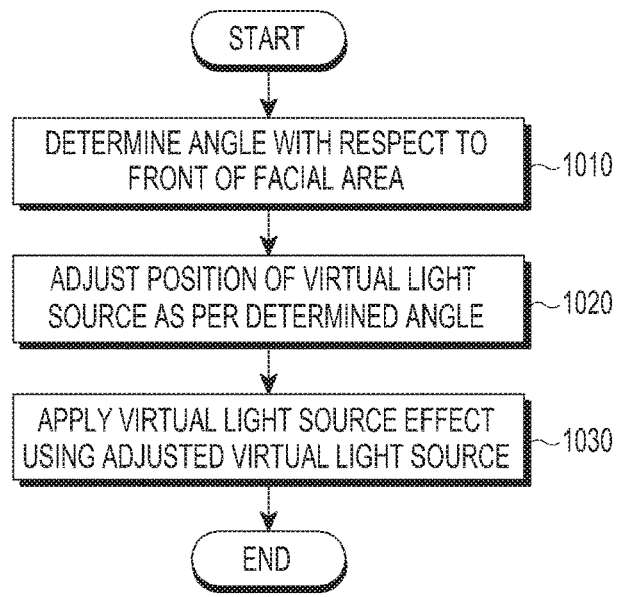
FIG. 10 is a flowchart illustrating a method for controlling an electronic device according to an embodiment of the present disclosure.

FIG. 10 is a flowchart illustrating a method for controlling an electronic device according to an embodiment of the present disclosure.

Referring to FIG. 10, in operation 1010, the electronic device 101 may determine the angle of the facial area in the image with respect to the front. The electronic device 101 may determine the angle of the facial area with respect to the front based on a result of the above-described object detection. For example, the angle may include at least one of yaw, pitch, and roll.

In operation 1020, the electronic device 101 may adjust the position of the virtual light source depending on the determined angle. The electronic device 101 may preset the position of the virtual light source and adjust the position of the virtual light source by rotating the preset virtual light source at the determined angle.

In operation 1030, the electronic device 101 may apply a virtual light source effect using the adjusted virtual light source.

According to an embodiment of the present disclosure, the electronic device 101 may also display the image without rotating the position of the virtual light source. Specifically, although the electronic device 101 detects the facial area not facing the front, the electronic device 101 may apply a virtual light source effect and display the image, with the virtual light source fixed at the preset position.

Figure 11:
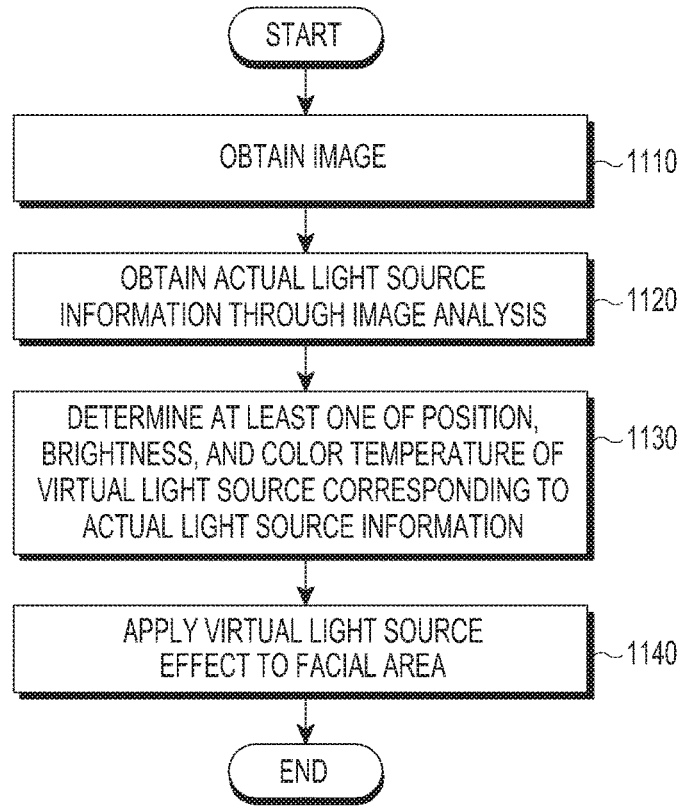
FIG. 11 is a flowchart illustrating a method for controlling an electronic device according to an embodiment of the present disclosure.

FIG. 11 is a flowchart illustrating a method for controlling an electronic device according to an embodiment of the present disclosure.

Figure 12A:
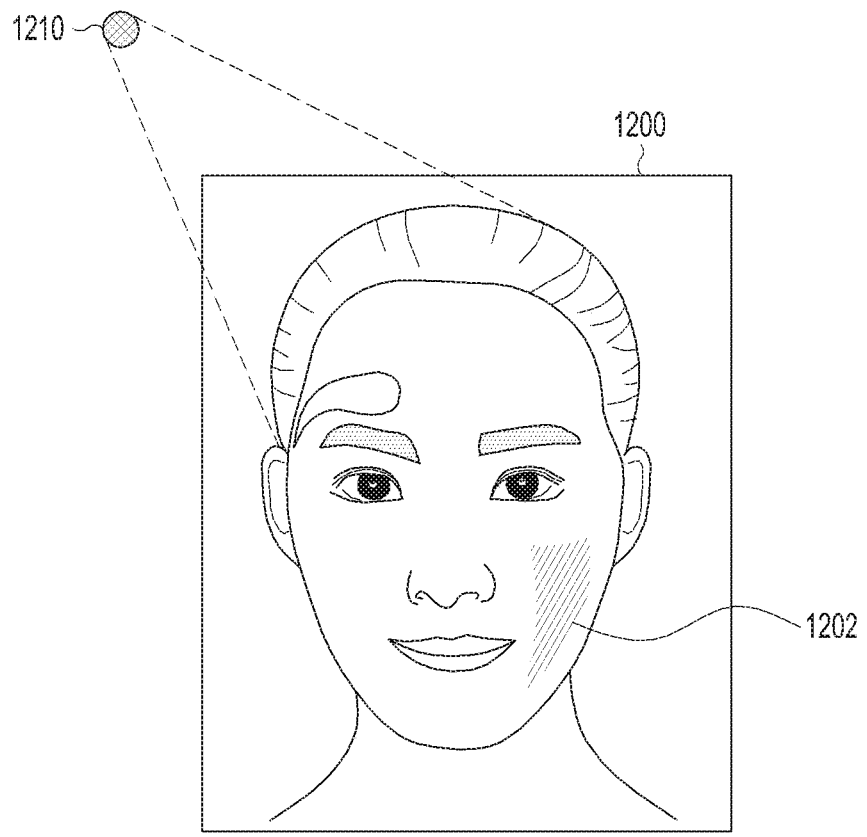
FIGS. 12A and 12B are concept views illustrating an actual light source and a virtual light source according to an embodiment of the present disclosure.
Figure 12B:
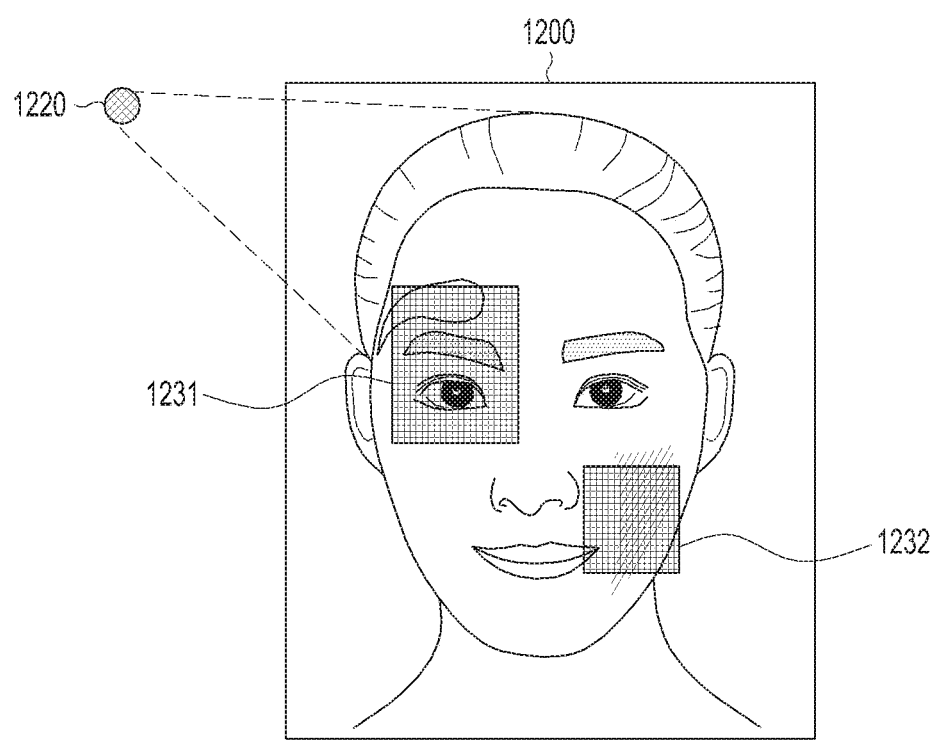

FIGS. 12A and 12B are concept views illustrating an actual light source and a virtual light source according to an embodiment of the present disclosure.

Referring to FIG. 11, the method is described in detail with further reference to FIGS. 12A and 12B.

In operation 1110, the electronic device 101 may obtain an image 1200 as shown in FIG. 12A. Referring to FIG. 12A, the image 1200 is an image captured in an environment of an actual light source 1210, which may include a brighter area 1201 by the actual light source 1210 and a darker area 1202 by the actual light source 1210. The brighter area 1201 and the darker area 1202 respectively include a pixel having a relatively high brightness value and a pixel having a relatively low brightness value.

In operation 1120, the electronic device 101 may obtain actual light source information through image analysis. According to an embodiment of the present disclosure, the electronic device 101 may obtain at least one of color temperature, brightness, and position of the actual light source in the image by analyzing the histogram for at least a portion of the image, for example, pixel attributes of windows arranged at a predetermined interval, e.g., the magnitude and distribution of brightness, color, and color temperature.

For example, the electronic device 101 may estimate the position of the current light source by making comparison as to brightness of each area (forehead, cheekbone, nose, or eyes) of the face. In the above embodiment of the present disclosure, the electronic device 101 may determine that the left cheekbone area is 20% brighter than the left cheekbone area and that there is little shadow in the nose and eye areas, thereby estimating that the light source is positioned left in a 45-degree direction of the face.

In operation 1130, the electronic device 101 may determine at least one of position, brightness, color, and color temperature of the virtual light source corresponding to the light source information on the actual light source. In the embodiment related to FIG. 12B, the electronic device 101 may determine the position of a virtual light source 1220 to correspond to the position of the actual light source 1210. Thus, a natural virtual light source effect may be applied without interfering with the light source effect by the actual light source.

According to an embodiment of the present disclosure, the electronic device 101 may determine the brightness of the virtual light source based on the correspondence between the type of actual light source and the brightness of virtual light source as shown in Table 4.

TABLE 4

| Type of actual light source | Sunlight | Fluorescent light | Incandescent light | Low illumination intensity |
|---|---|---|---|---|
| Brightness of virtual light source | Low | High | High | Middle |

For example, when it is determined as the image analysis result that the type of actual light source is sunlight, the electronic device 101 may set the brightness of virtual light source to be relatively low. Accordingly, the electronic device 101 may set the brightness adjustment ratio of image pixel by the virtual light source to be relatively low and adjust the brightness of pixel.

In an example, the electronic device 101 may determine that the actual light source has a color temperature of 3800K and a brightness of 150 lux, and its type is a fluorescent light. The electronic device 101 may set 150 lux and 3800 k which is for a relatively high brightness, as light source information on the virtual light source based on, e.g., Table 4. According to an embodiment of the present disclosure, the electronic device 101 may determine a virtual light source having a color temperature different from the color temperature of the actual light source.

According to an embodiment of the present disclosure, the electronic device 101 may determine an upper limit of the pixel attribute adjustment ratio by the virtual light source. For example, the electronic device 101 may store the correlation information between actual light source information and pixel attribute adjustment ratio as shown in Table 5.

TABLE 5

|  | Fluorescent light | Incandescent light | Sunlight |
| --- | --- | --- | --- |
| Forehead | 50 | 40 | 35 |
| Cheekbone | 35 | 35 | 20 |
| Chin | 20 | 30 | 10 |

For example, upon determining that the type of actual light source is a fluorescent light, the electronic device 101 may limit the adjustment ratio of pixel brightness for the forehead object to a range from +50% to −50%.

In operation 1140, the electronic device 101 may apply a virtual light source effect to the facial area and display the same. As shown in FIG. 12*b*, the electronic device 101 may adjust the attribute of pixels in at least one area 1231 and 1232 of the facial area based on the determined light source information on the virtual light source 1220 and display the same.

Figure 13:
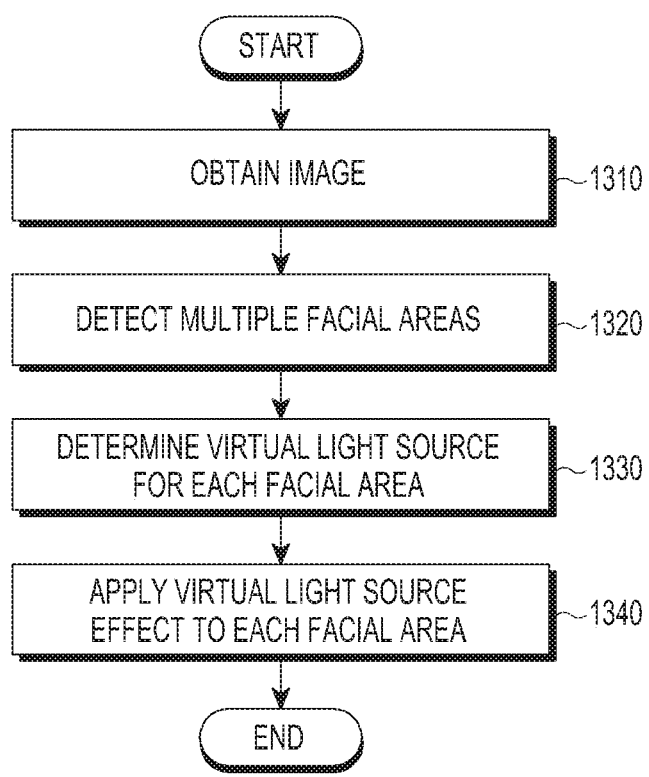
FIG. 13 is a flowchart illustrating a method for controlling an electronic device according to an embodiment of the present disclosure.

FIG. 13 is a flowchart illustrating a method for controlling an electronic device according to an embodiment of the present disclosure.

Figure 14A:
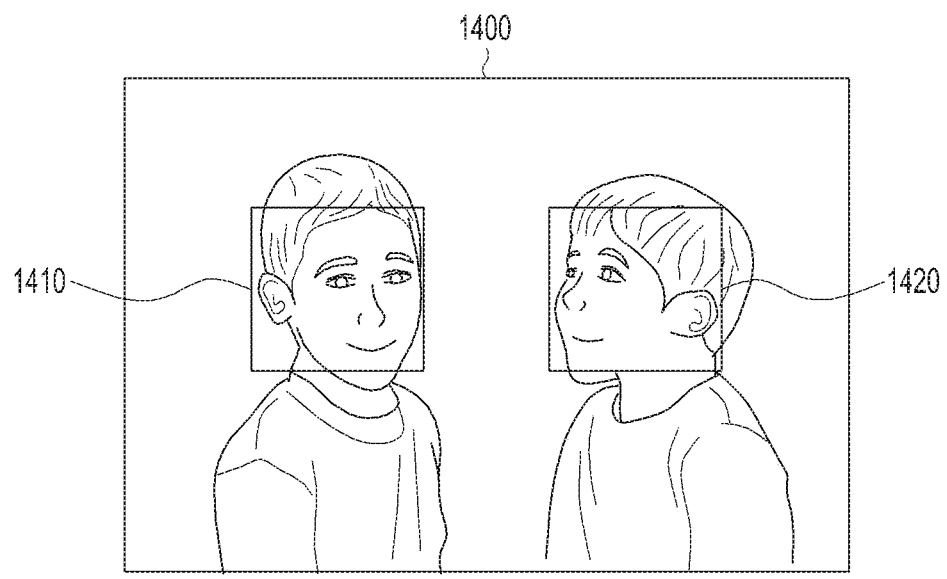
FIG. 14A illustrates an image according to an embodiment of the present disclosure.

FIG. 14A illustrates an image according to an embodiment of the present disclosure.

Figure 14B:
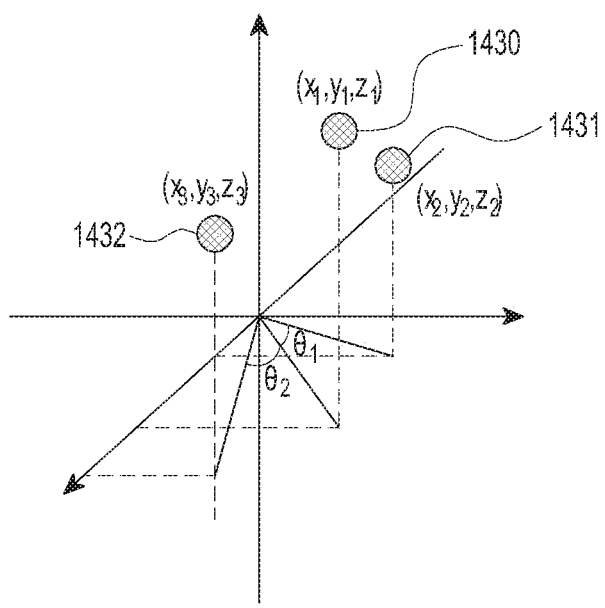
FIG. 14B is a concept view illustrating a position of a virtual light source according to an embodiment of the present disclosure.

FIG. 14B is a concept view illustrating a position of a virtual light source according to an embodiment of the present disclosure.

Referring to FIG. 13, the method is described in detail with further reference to FIGS. 14A and 14B.

In operation 1310, as shown in FIG. 14A, the electronic device 101 may obtain an image 1400.

The image 1400 may include a plurality of facial areas.

In operation 1320, the electronic device 101 may detect a plurality of facial areas 1410 and 1420.

In operation 1330, the electronic device 101 may determine a virtual light source for each of the plurality of facial areas 1410 and 1420. The electronic device 101 may determine first posture information on a first facial area 1410. The electronic device 101 may determine second posture information on a second facial area 1420. The electronic device 101 may determine a first virtual light source 1431 based on the first posture information as shown in FIG. 14B. The electronic device 101 may determine a second virtual light source 1432 based on the second posture information as shown in FIG. 14B. For example, the electronic device 101 may move the virtual light source 1430 located at a preset position (x1,y1,z1) based on the first posture information to determine the position (x2,y2,z2) of the first virtual light source 1431. For example, when the first posture information is rotation at yaw at θ1, the electronic device 101 may determine the position (x2,y2,z2) of the first virtual light source 1431 by rotating the virtual light source 1430 located at the preset position by θ1. Further, the electronic device 101 may move the virtual light source 1430 located at a preset position (x1,y1,z1) based on the second posture information to determine the position (x3,y3,z3) of the second virtual light source 1432. For example, when the second posture information is rotation at yaw at θ2, the electronic device 101 may determine the position (x3,y3,z3) of the second virtual light source 1432 by rotating the virtual light source 1430 located at the preset position by θ2.

In operation 1340, the electronic device 101 may apply a virtual light source effect to each of the plurality of facial areas. The electronic device 101 may apply an effect by the first virtual light source 1431 to the first facial area 1410 and an effect by the second virtual light source 1432 to the second facial area 1420. Accordingly, for an image including a plurality of facial areas, the electronic device 101 may apply a desired virtual light source effect to each facial area according to an embodiment of the present disclosure.

Figure 15:
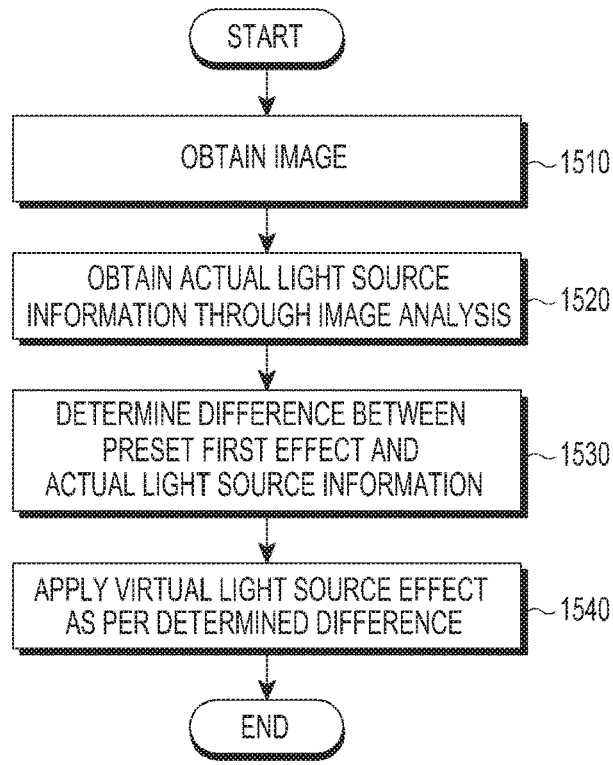
FIG. 15 is a flowchart illustrating a method for controlling an electronic device according to an embodiment of the present disclosure.

FIG. 15 is a flowchart illustrating a method for controlling an electronic device according to an embodiment of the present disclosure.

Referring to FIG. 15, in operation 1510, the electronic device 101 may obtain an image. In operation 1520, the electronic device 101 may obtain actual light source information through image analysis. In operation 1530, the electronic device 101 may determine a difference between a preset first effect and actual light source information. Here, the first effect may be an effect by a virtual light source to be applied and may be an effect by a virtual light source at a preset position.

According to an embodiment of the present disclosure, the electronic device 101 may extract the difference between a current light source condition and a recommended light source condition for each area of the face (e.g., forehead, nose, cheekbone, chin), and as a result, may determine a light source condition that should be additionally applied. The electronic device 101 may synthesize the light source condition additionally applied per area with the image of the current light source condition to generate a final resultant synthesized image and display the synthesized image to determine whether to perform image capturing under the current condition.

According to an embodiment of the present disclosure, the electronic device 101 may determine a recommended illumination condition for an ideal illumination environment. For example, assuming that the recommended illumination condition is 3800K and 300 lux, yaw+−45 degrees, and pitch 45 degrees, the electronic device 101 may calculate the difference from the current face light source condition from the current light source and face angle. The above ideal illumination environment may be an illumination environment that exhibits the smallest difference from the effect by the light source when the actual light source is placed. Accordingly, the electronic device 101 may determine the recommended illumination condition corresponding to the illumination environment having the smallest difference in the effect by the light source when the actual light source is placed.

In operation 1540, the electronic device 101 may apply a virtual light source effect according to the determined difference.

Figure 16:
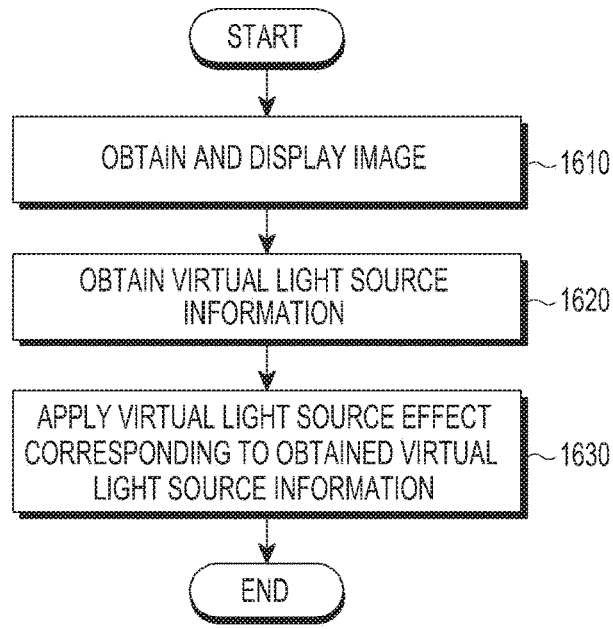
FIG. 16 is a flowchart illustrating a method for controlling an electronic device according to an embodiment of the present disclosure.

FIG. 16 is a flowchart illustrating a method for controlling an electronic device according to an embodiment of the present disclosure.

Referring to FIG. 16, in operation 1610, the electronic device 101 may obtain and display an image. In operation 1620, the electronic device 101 may obtain virtual light source information. The electronic device 101 may obtain at least one of, e.g., position, brightness, color, and color temperature of the virtual light source. As described above, the virtual light source information may be set by the user, previously set, or may be set by at least one of posture information and actual light source information.

In operation 1630, the electronic device 101 may apply a virtual light source effect corresponding to the obtained virtual light source information. For example, the electronic device 101 may adjust the pixel attribute according to the distance between virtual light source and pixel and display the same. That is, according to an embodiment of the present disclosure, the electronic device 101 may apply the virtual light source effect to the image without detecting object and display the same.

FIGS. 17A to 17F are concept views illustrating a graphic user interface according to an embodiment of the present disclosure.

Figure 17A:
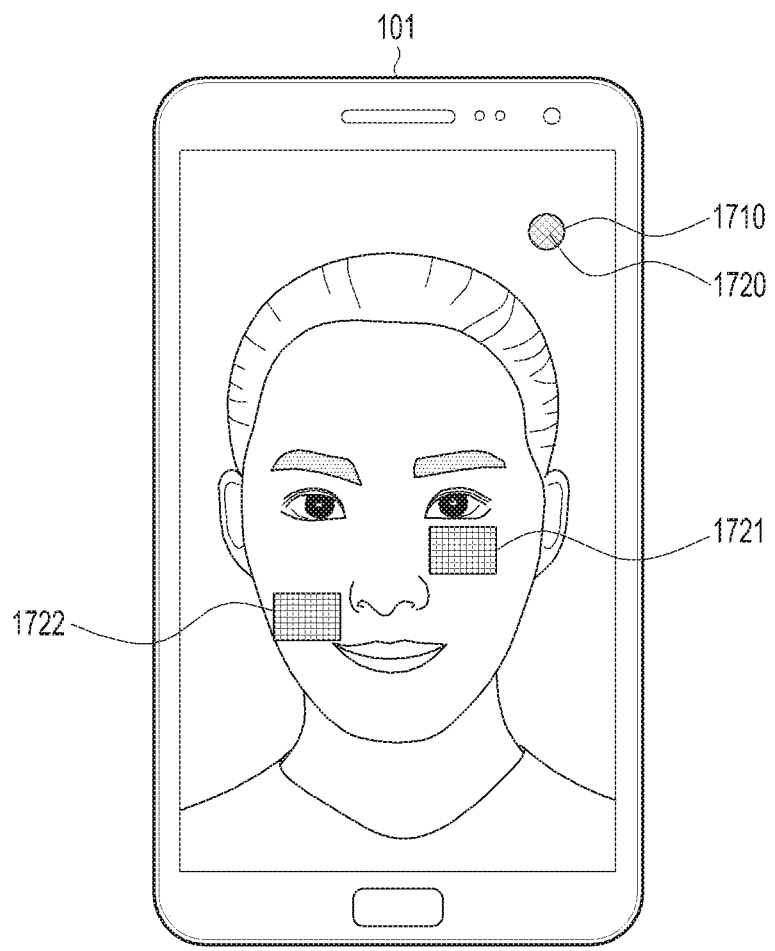
FIGS. 17A to 17F are concept views illustrating a graphic user interface according to an embodiment of the present disclosure.

Referring to FIG. 17A, the electronic device 101 may display an image 1710 to which an effect by a virtual light source 1720 has been applied. For example, the electronic device 101 may display an object 1721 positioned relatively close to the virtual light source 1720 to be brighter than the original image and an object 1722 positioned relatively farther from the virtual light source 1720 to be darker than the original image.

Figure 17B:
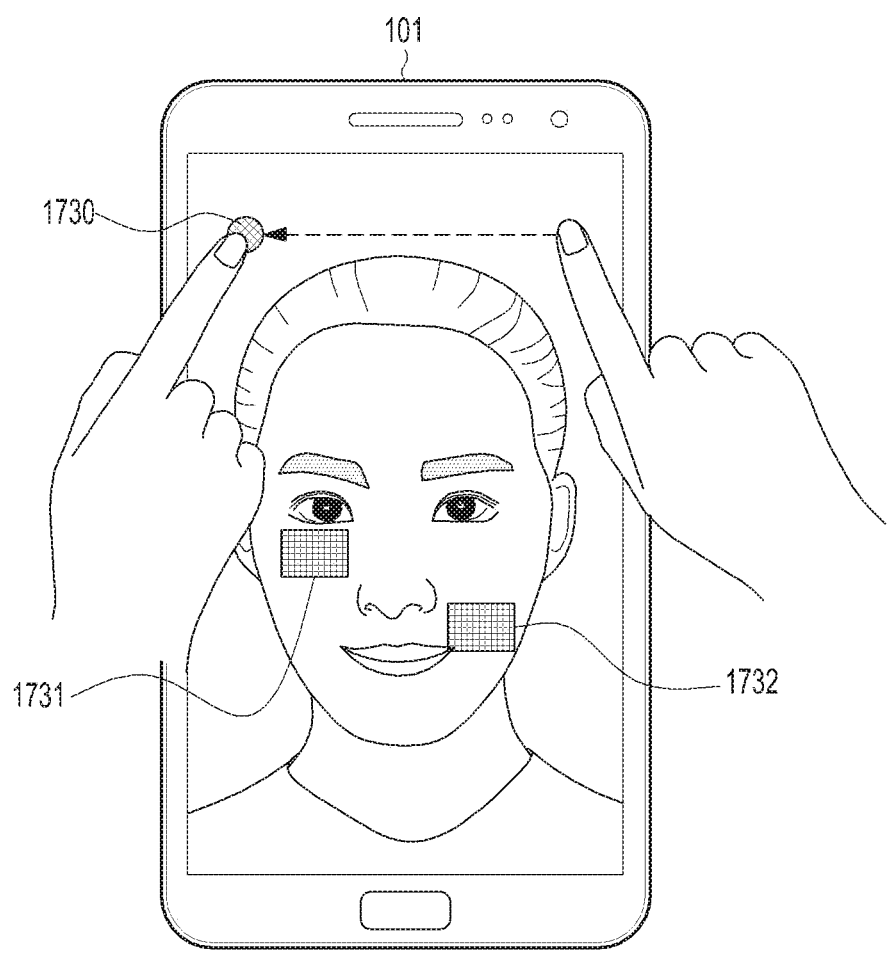

Referring to FIG. 17B, the electronic device 101 may obtain a virtual light source move command, such as a drag gesture. The electronic device 101 may display a position-varied virtual light source 1730 according to the virtual light source move command. Further, the electronic device 101 may apply an effect by the position-varied virtual light source 1730 and display the same. For example, the electronic device 101 may display an object 1731 positioned relatively close to the virtual light source 1730 to be brighter than the original image and an object 1732 positioned relatively farther from the virtual light source 1730 to be darker than the original image.

Figure 17C:
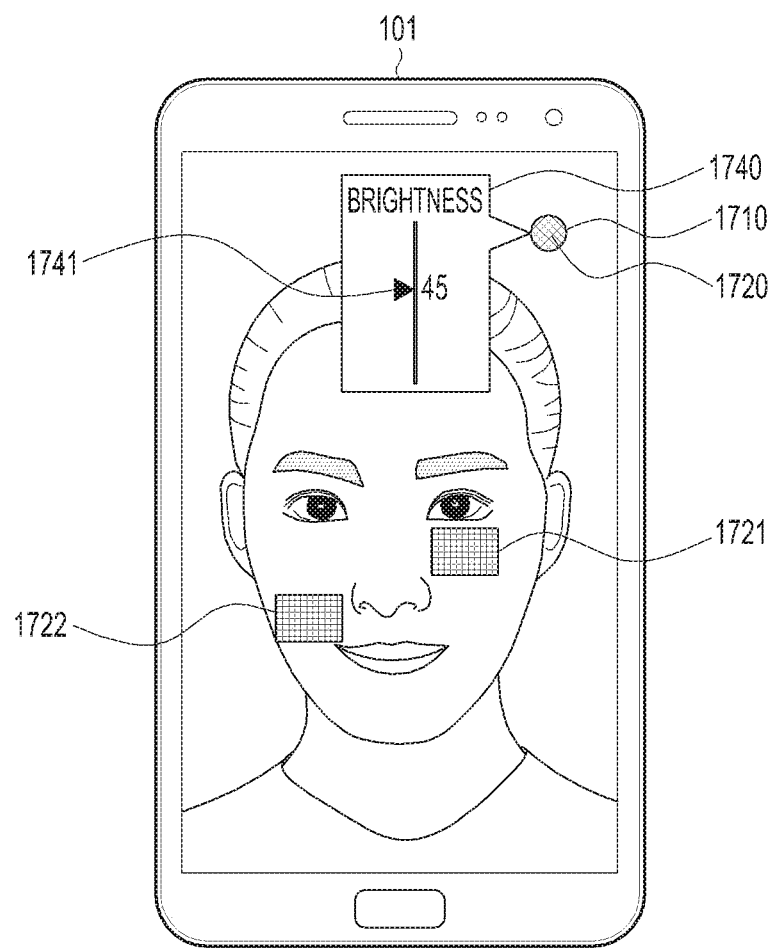

Referring to FIG. 17C, the electronic device 101 may display a virtual light source brightness adjustment window 1740. According to an embodiment of the present disclosure, the virtual light source brightness adjustment window 1740 may include a brightness indicator 1741. The electronic device 101 may set the brightness of the virtual light source to a value corresponding to the brightness indicator 1741. Further, according to a move command for the brightness indicator 1741, the electronic device 101 may shift the brightness indicator 1741 to another value and may adjust the corresponding value to the brightness of the virtual light source.

Figure 17D:
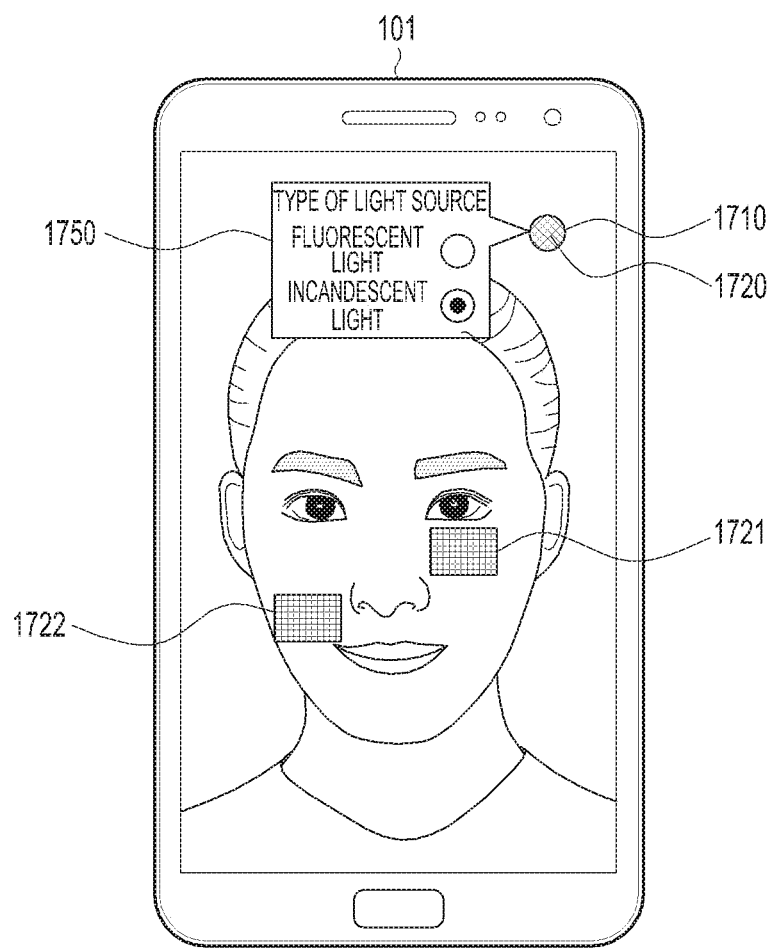

Referring to FIG. 17D, the electronic device 101 may display a virtual light source type adjustment window 1750. According to an embodiment of the present disclosure, the virtual light source type adjustment window 1750 may include at least one type of virtual light source and a selection window corresponding to each type. The electronic device 101 may set the selected type of virtual light source to the type of the virtual light source.

Figure 17E:
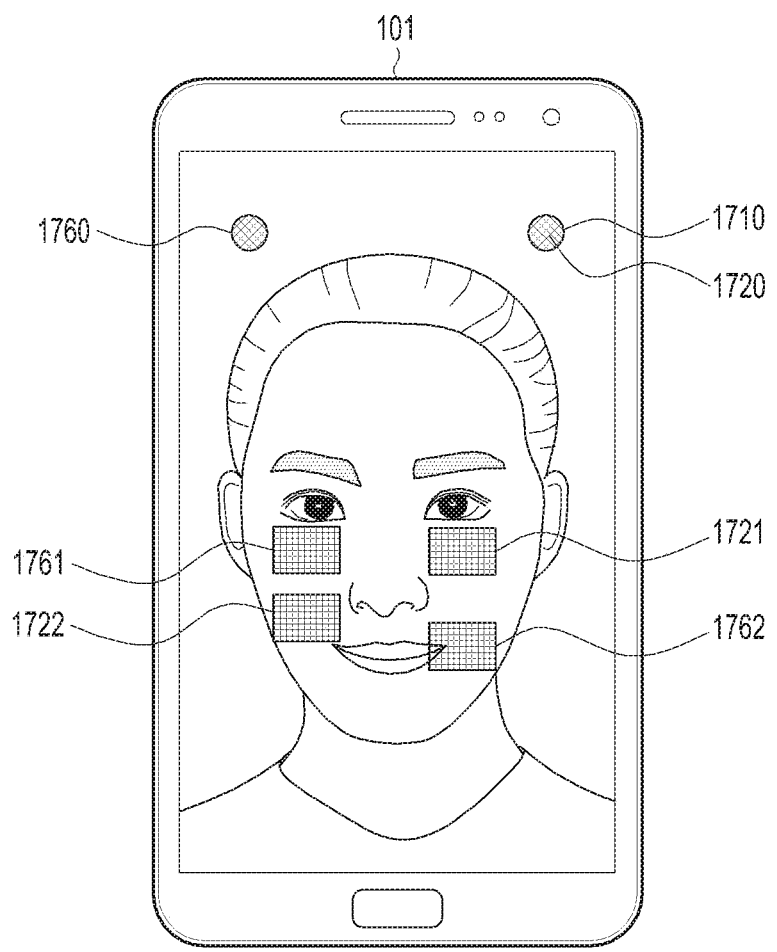

Referring to FIG. 17E, the electronic device 101 may apply an effect by each of a plurality of virtual light sources 1710 and 1760 to the image and display the image. For example, the electronic device 101 may apply an effect by an additional virtual light source 1760 to areas 1761 and 1762. The electronic device 101 may simultaneously apply the effect by the virtual light source 1710 to the areas 1711 and 1712. Accordingly, the electronic device 101 may display the image to which the effect by the plurality of illumination environments has applied.

Figure 17F:
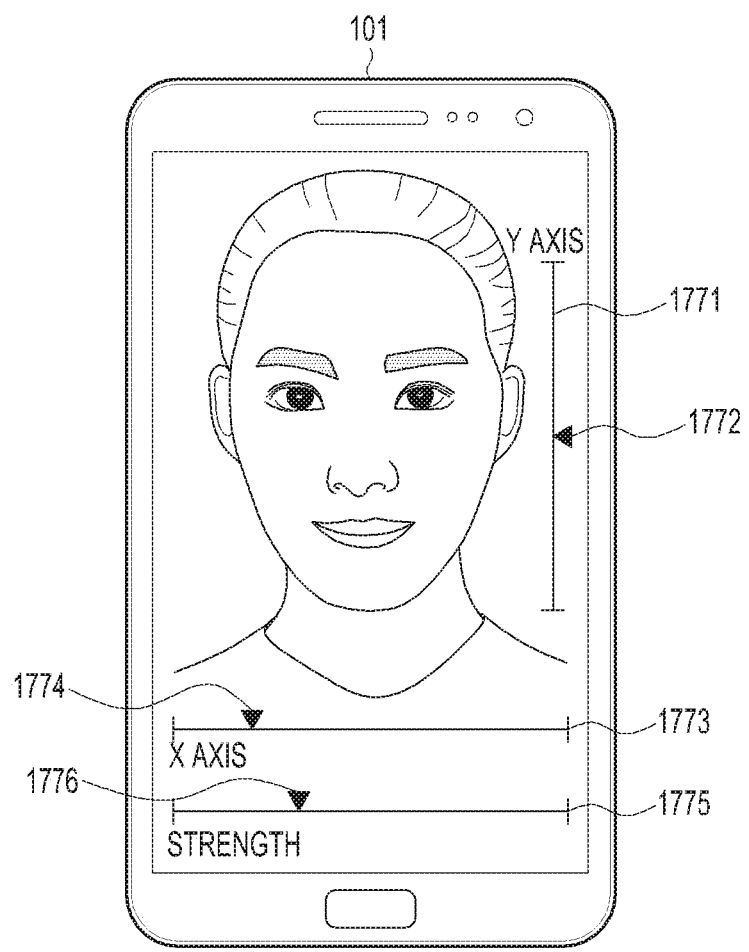

FIG. 17F is a concept view illustrating a user graphic interface for input of virtual light source information according to an embodiment of the present disclosure.

Referring to FIG. 17F, the electronic device 101 may include a y-axis rotation window 1711 of a virtual light source, an x-axis rotation window 1773, and a brightness adjustment window 1775, and indicators 1772, 1774, and 1776 indicating the respective values. The electronic device 101 may determine the light source information on the virtual light source as the values respectively corresponding to the indicators 1772, 1774, and 1776 and may apply the virtual light source effect to the image using the determined light source information and display the same.

Figure 18:
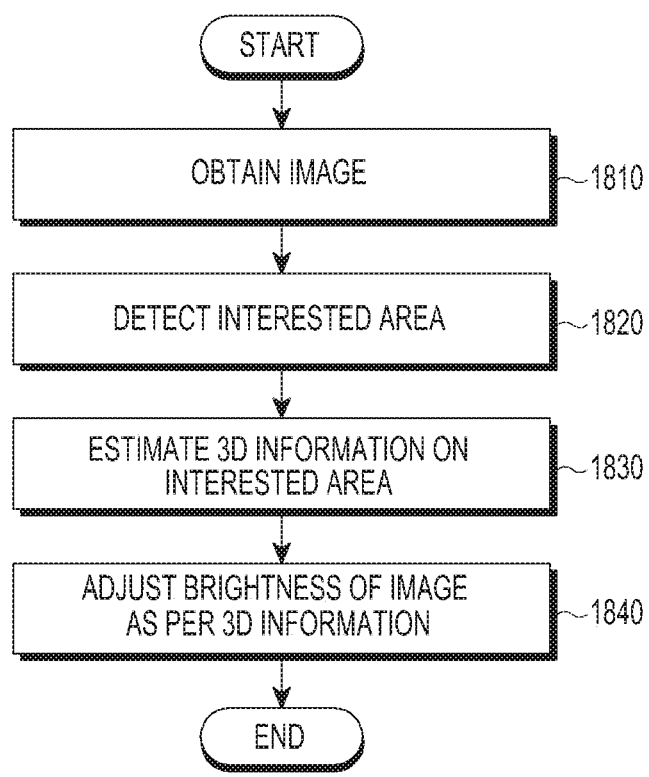
FIG. 18 is a flowchart illustrating a method for controlling an electronic device according to an embodiment of the present disclosure.

FIG. 18 is a flowchart illustrating a method for controlling an electronic device according to an embodiment of the present disclosure.

Figure 19:
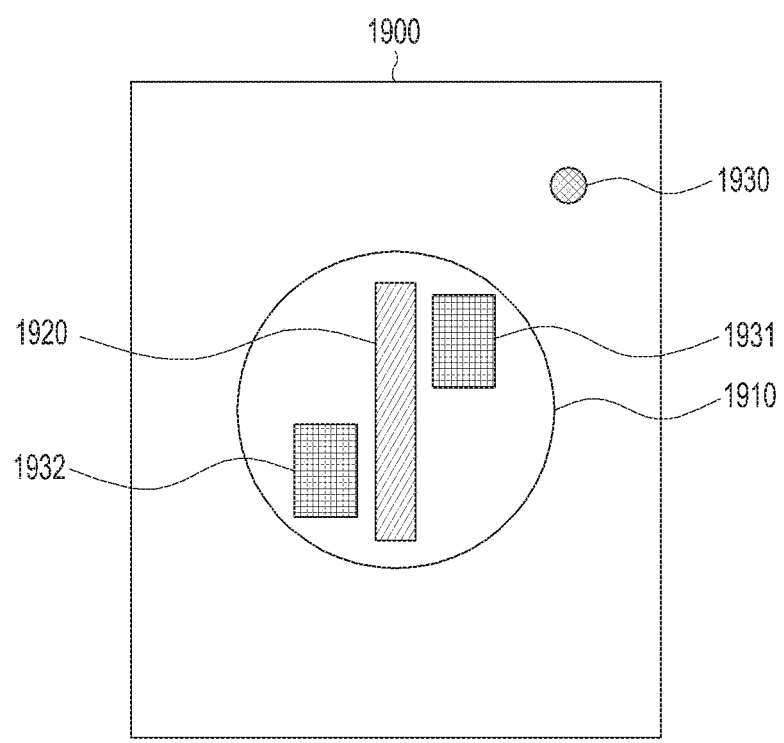
FIG. 19 is a concept view illustrating a captured image of an object according to an embodiment of the present disclosure.

FIG. 19 is a concept view illustrating a captured image of an object according to an embodiment of the present disclosure.

Referring to FIG. 18, the method is described in detail with further reference to FIG. 19.

In operation 1810, the electronic device 101 may obtain an image 1900 as shown in FIG. 19. In operation 1820, the electronic device 101 may detect an interested area 1910. For example, the electronic device 101 may detect the interested area 1910 based on the feature or color of the image 1900.

In operation 1830, the electronic device 101 may estimate 3D information on the interested area 1910. For example, the electronic device 101 may additionally determine that the detected interested area 1910 is a "ball." The electronic device 101 may obtain 3D information indicating that a middle area 1920 protrudes most, which is basic 3D information on the "ball." The electronic device 101 may configure a virtual light source 1930 and may adjust the brightness of the image according to the 3D information in operation 1840. For example, the electronic device 101 may adjust an area 1931 positioned closer to the virtual light source 1930 with respect to the middle area 1920 to be brighter than the original image and display the same, and the electronic device 101 may adjust an area 1932 positioned farther than the virtual light source 1930 to be brighter than the original image and display the same.

As described above, according to the present disclosure, a virtual light source effect may be applied to any object other than the facial area of a figure without performing 3D rendering.

Figure 20A:
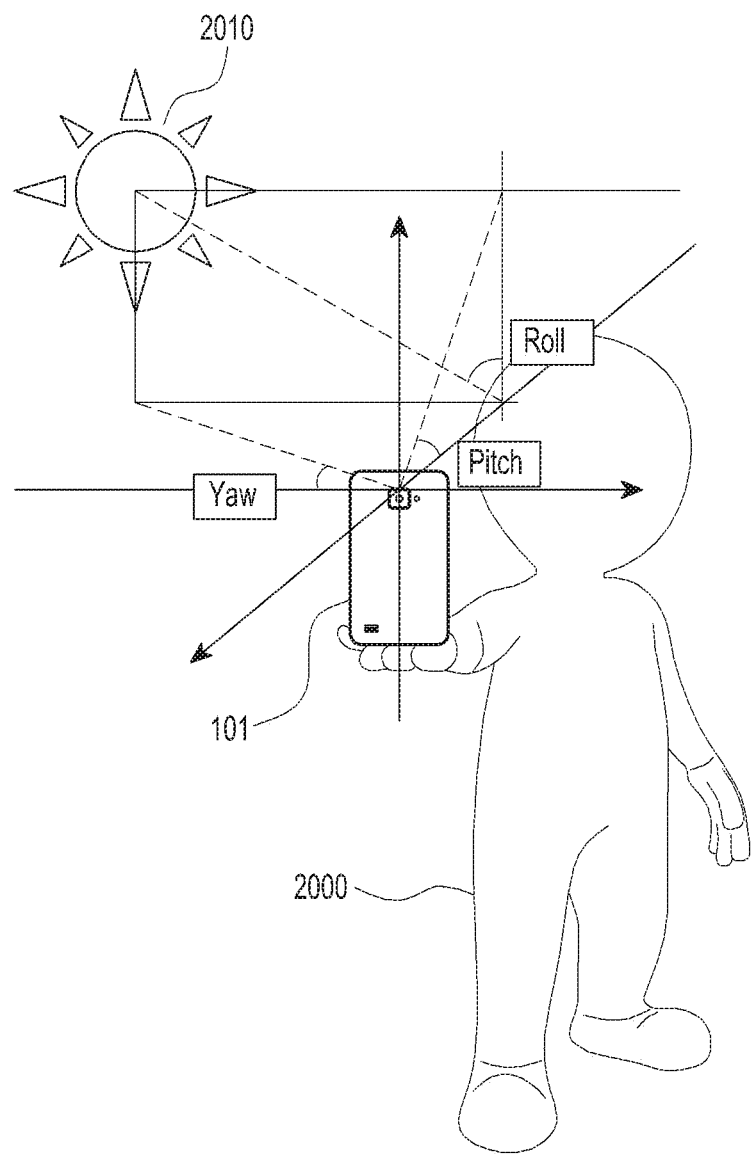
FIGS. 20A and 20B are concept views illustrating a user graphic interface displaying actual light source information according to an embodiment of the present disclosure.
Figure 20B:
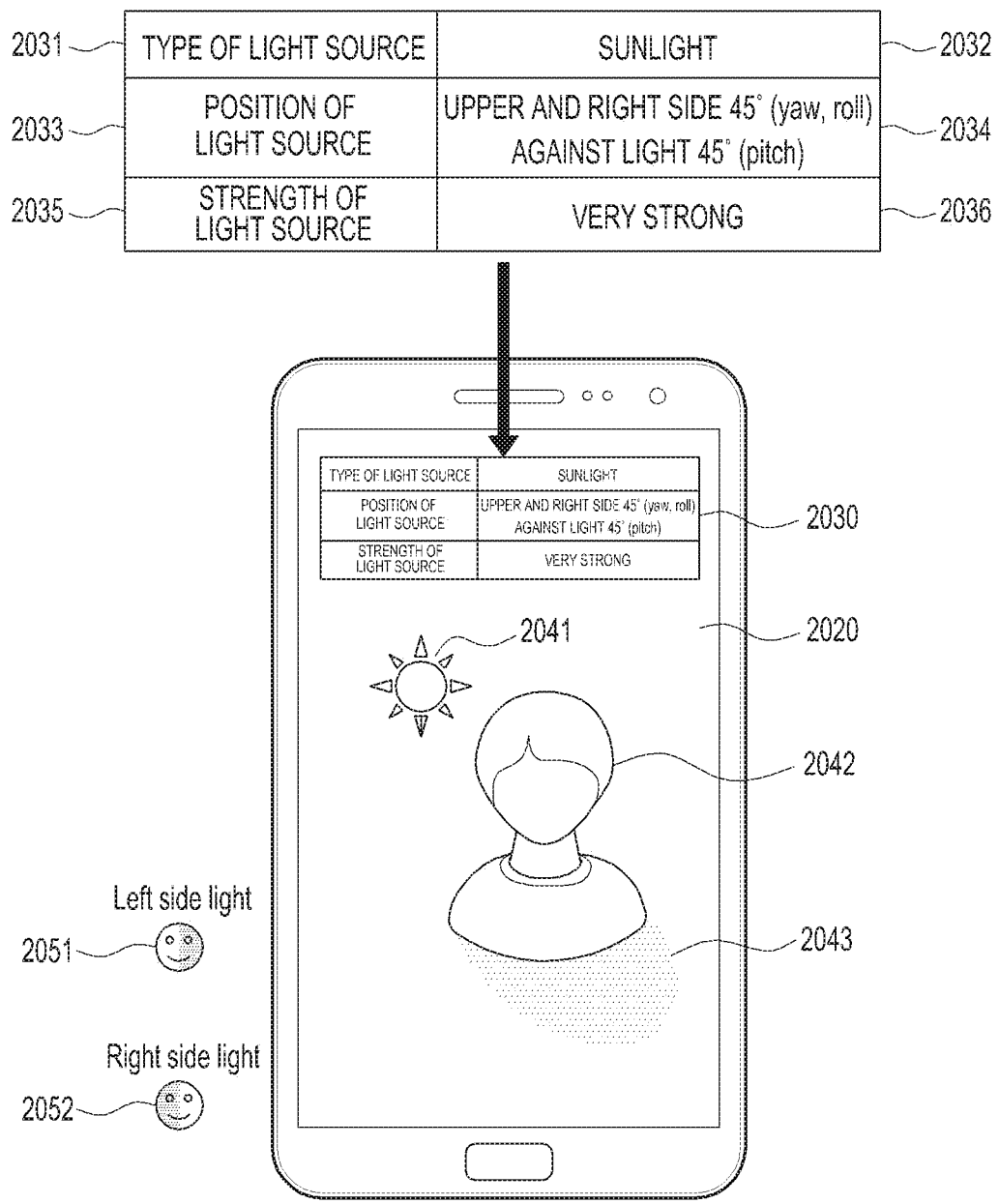

FIGS. 20A and 20B are concept views illustrating a user graphic interface displaying actual light source information according to an embodiment of the present disclosure.

Referring to FIG. 20A, a concept view is provided illustrating an actual image capturing environment and illustrates a user 2000 and an actual light source (sunlight) 2010 currently present around. The position of the light source may be implemented to include at least one of yaw, pitch, and roll with respect to a particular position (e.g., a camera) of the electronic device 101 and may be implemented to include information on one or more of x, y, and z with respect to the user's face.

The type of light source may be determined using a histogram-based white balance applied algorithm. A basic histogram-based white balance algorithm may be configured to determine the histogram of a particular area to determine the color temperature of light source based on a major color of the area.

The position information may be reconfigured to be easily known to the user and may be then provided to the user. For example, when yaw and roll are 45 degrees, and pitch is 45 degrees in FIG. 20A, the electronic device 101 may convert it into a Table 2030 including a simplified form, such as "sunlight, right and upper side, against light, very strong," as shown in FIG. 20B and display the Table 2030. In this case, the Table 2030 can include a row indicating "Type of Light Source" 2031, Position of Light Source" 2033, and "Strength of Light Source" 2035, but embodiments are not limited thereto. Values of each can be indicated at 2032, 2034 and 2036, respectively.

According to an embodiment of the present disclosure, the electronic device 101 may provide actual light source information to the user through a GUI 2020 instead of text or diagram, as shown in FIG. 20B. The GUI 2020 may be displayed on the screen at a position relative to an actual light source 2041 and object (icon or actual image) 2042, and a sun-shaped icon when the light source is sunlight, and a fluorescent light-shaped icon (not shown) when the light source is a fluorescent light, may be displayed, and its position may be determined reflecting the current position of the actual light source. For example, when the actual light source is positioned at a right side as shown in FIG. 20B, the GUI 2041 of the light source is also displayed at the right side of the object, and when the light source is positioned at a left side of the user, the GUI 2041 of the light source may also be displayed at the left side of the object.

Alternatively, the size, contrast, or color of the GUI may be differently displayed in association with the strength of light source. For example, when the strength of light source is analyzed as "very strong," an increased contrast of light source may be displayed, and when the strength of light source is analyzed as "weak," a relatively low contrast may be displayed.

According to an embodiment of the present disclosure, the electronic device 101 may display the position of the actual light source with separate icons 2051 and 2052. For example, when the light source is positioned at a left side, the electronic device 101 may display an icon 2051 with a left half displayed brighter and a right half displayed darker, and when the light source is positioned at a right side, the electronic device 101 may display an icon 2052 with a right half displayed brighter and a left half displayed darker.

According to an embodiment of the present disclosure, the electronic device 101 may differently display a shadow 2043 depending on the position and strength of the light source. For example, when the light source is positioned at an upper and right side of the user as shown in FIG. 20B, the shadow 2043 may be displayed at a left and lower side of the object. As the brightness of light source increases, the electronic device 101 may darken the color of the shadow 2043.

Figure 21A:
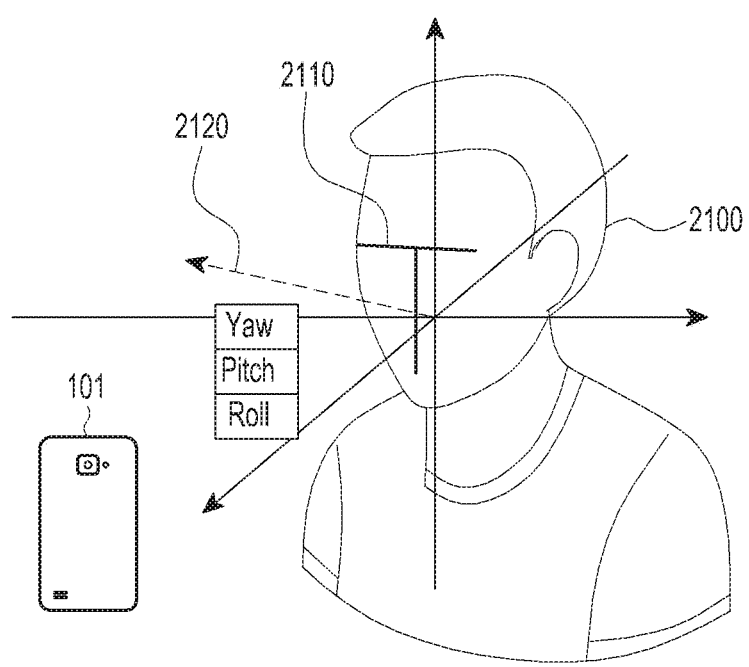
FIGS. 21A and 21B are concept views illustrating a user graphic interface displaying posture information according to an embodiment of the present disclosure.
Figure 21B:
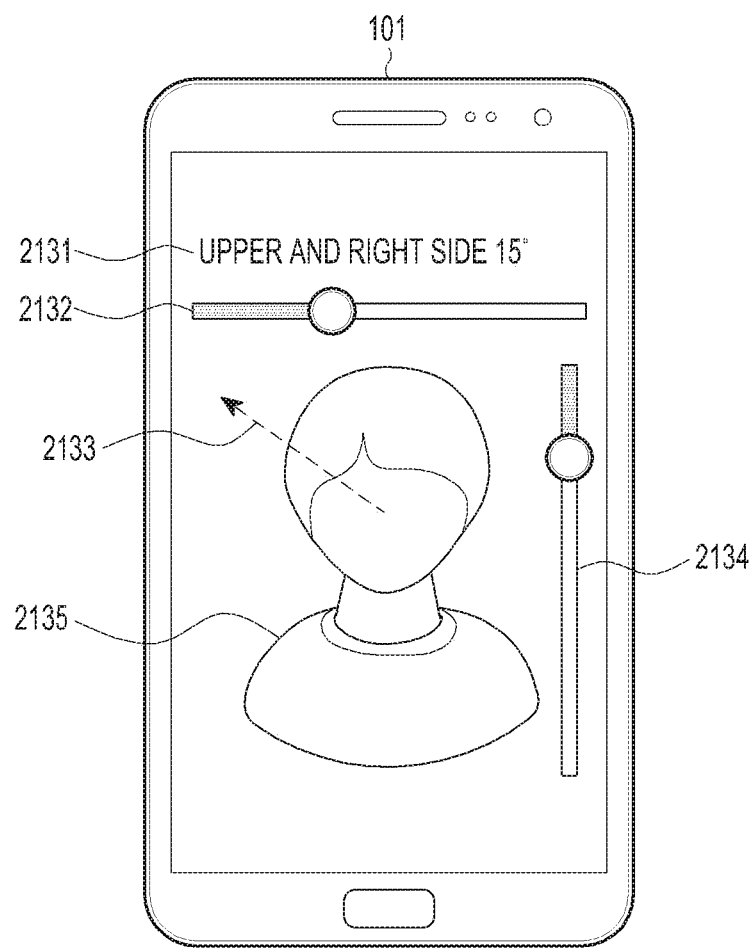

FIGS. 21A and 21B are concept views illustrating a user graphic interface displaying posture information according to an embodiment of the present disclosure.

Referring to FIG. 21A, the electronic device 101 may obtain an image for the face of a user 2100 using a camera and estimate a position or angle 2120 of the face from a feature point 2110 of the image. The electronic device 101 may display the estimated information as shown in FIG. 21B.

For example, the electronic device 101 may represent the result of analysis in text 2131 or diagram (not shown). As another example, the electronic device 101 may display how much the face has been rotated with respect to the center in the horizontal and vertical areas as shown in a GUI 2131 and 2135. As shown in FIG. 21B, when the user's face is oriented to the left and upward, the electronic device 101 may configure direction indicators 2132 and 2134 to be positioned more to the left and upward from the center on the GUI. Further, the electronic device 101 may display the direction in which the face of the object is oriented, as denoted by arrow 2133.

Figure 22:
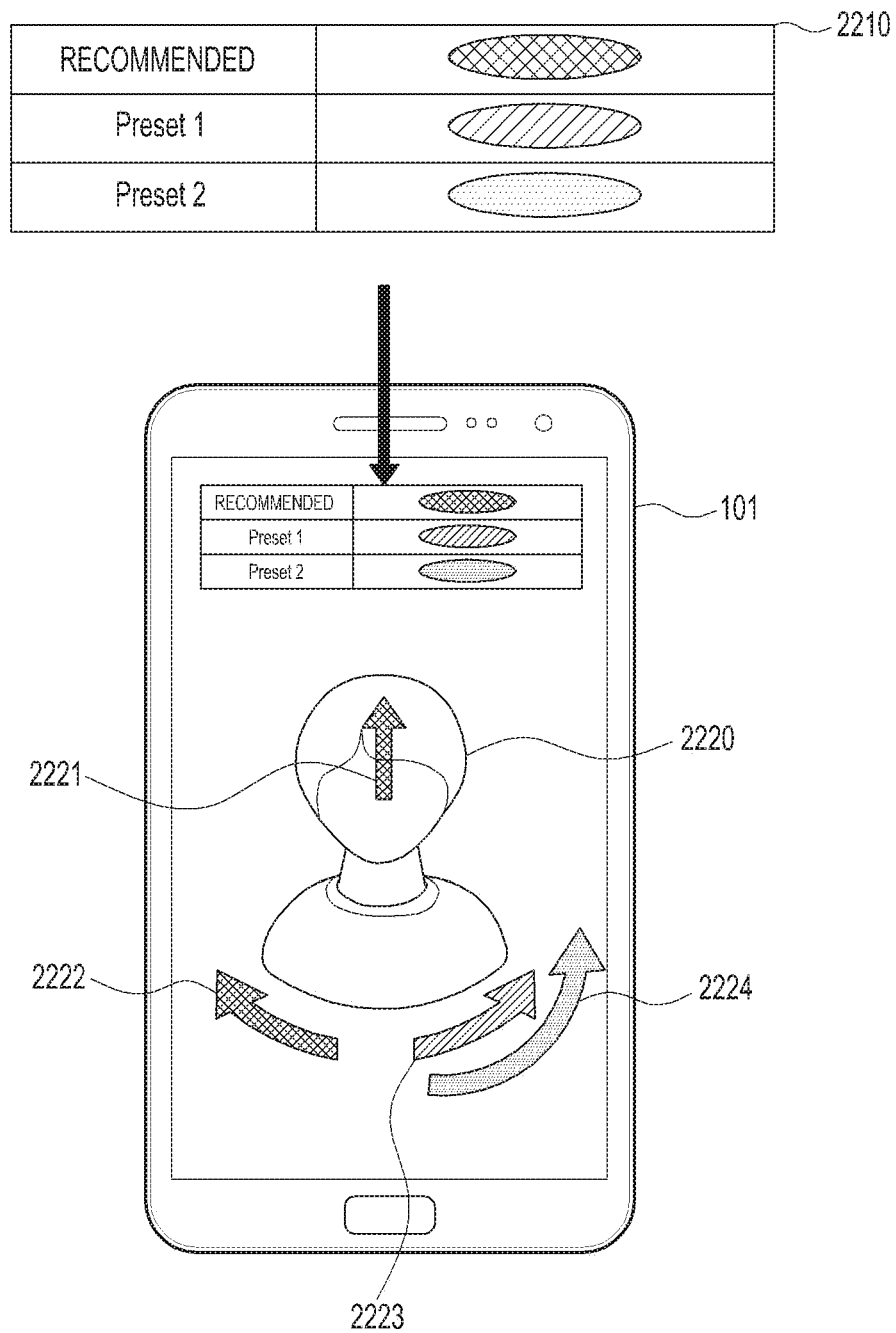
FIG. 22 is a concept view illustrating a user graphic interface displaying a guide of a position and direction of a face according to an embodiment of the present disclosure.

FIG. 22 is a concept view illustrating a user graphic interface displaying a guide of a position and direction of a face according to an embodiment of the present disclosure.

Referring to FIG. 22, the electronic device 101 may perform analysis on the direction of one or more cameras so that the cameras may make comparison as to the conditions for light source and face regarding various directions. For example, the user may conduct image 2220 capturing while turning around at 360 degrees while holding the electronic device 101. The electronic device 101 may thus store position information and images at various angles, and the electronic device 101 may select the position exhibiting the most natural virtual light source effect from the stored images. In an embodiment of the present disclosure, the electronic device 101 may select an image with the smallest difference from a preset virtual light source effect.

The electronic device 101 may display a Table 2210 for each of a plurality of images and a preset virtual light source effect. The electronic device 101 may also display guides 2221, 2222, 2223, and 2224 allowing a posture corresponding to the selected image to be taken.

Figure 23:
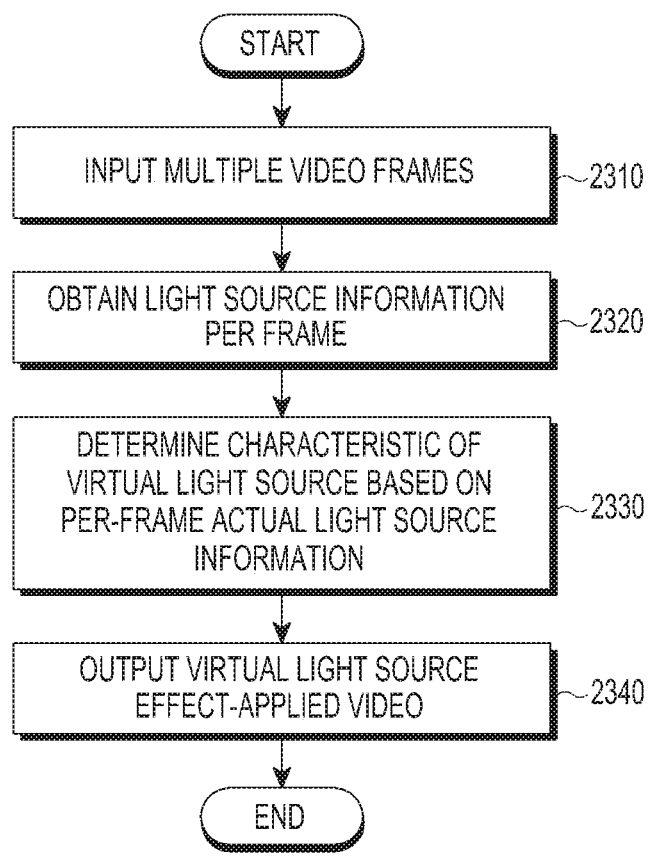
FIG. 23 is a flowchart illustrating a method for outputting a video according to an embodiment of the present disclosure.

FIG. 23 is a flowchart illustrating a method for outputting a video according to an embodiment of the present disclosure.

Figure 24:
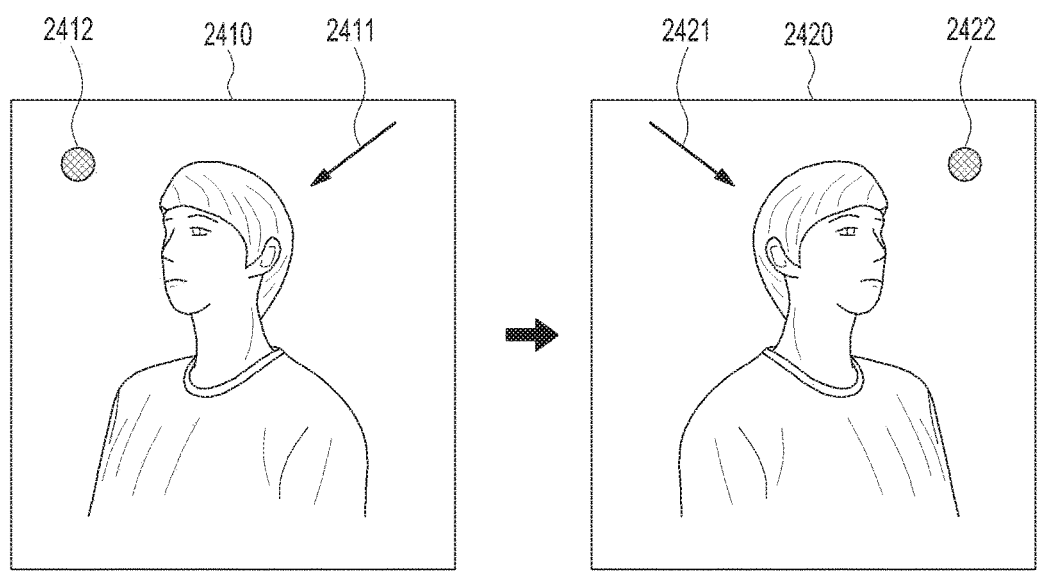
FIG. 24 is a concept view illustrating a frame of another video according to an embodiment of the present disclosure.

FIG. 24 is a concept view illustrating a frame of another video according to an embodiment of the present disclosure.

Referring to FIG. 23, the method is described in detail with further reference to FIG. 24.

In operation 2310, the electronic device 101 may receive a plurality of frames of video. The electronic device 101 may receive the plurality of frames of a video captured by the camera module or may receive the plurality of frames from other electronic device via wired/wireless communication.

In operation 2320, the electronic device 101 may obtain actual light source information per frame. The video may have per-frame actual light source information varied as per capturing conditions. For example, as shown in FIG. 24, the actual light source may be oriented in a right and upper direction 2411 in a first frame 2410, and the actual light source may be oriented in a left and upper direction 2421 in a second frame 2420.

For example, when the position of capturing by the camera is moved with respect to the captured object, the directions 2411 and 2421 of the actual light source in the first frame 2410 and the second frame 2420 may be varied. The electronic device 101 may obtain actual light source information per frame 2410 and 2420 according to the above-described various schemes. Although in FIG. 24 the directions 2411 and 2421 of actual light source are shown to be obtained, the electronic device 101 may alternatively obtain various types of light source information, such as the amount of light, color temperature, or color of the actual light source.

In operation 2330, the electronic device 101 may determine the characteristic of virtual light source based on the actual light source information per frame. For example, referring to FIG. 24, the electronic device 101 may determine that the position of a virtual light source 2412 is at the left and upper side corresponding to the direction 2411 of the actual light source at the right and upper side in the first frame 2410. Further, the electronic device 101 may determine that the position of a virtual light source 2422 is at the right and upper side corresponding to the direction 2412 of the actual light source at the left and upper side in the second frame 2420. The electronic device 101 may determine the virtual light source characteristic per frame corresponding to the actual light source information so that the same illumination effect may apply to each frame. As another example, it may be determined that the amount of light of the actual light source in the first frame 2410 is 40, and the amount of light of actual light source in the second frame 2420 is 10. In this case, the electronic device 101 may be configured to apply a virtual light source effect of a light amount of 50 to all of the frames. The electronic device 101 may adjust the light amount of all of the frames 2410 and 2420 to 50 by determining that the light amount of virtual light source 2412 in the first frame is 10, and the light amount of virtual light source 2422 in the second frame is 40. That is, the electronic device 101 may adaptively apply the virtual light source effect to the actual light source information varied per frame in operation 2340.

According to an embodiment of the present disclosure, a method for controlling an electronic device may comprise obtaining an image, detecting at least one object in a facial area from the image, and applying a virtual light source effect to the image based on an attribute of the detected object and displaying the image.

According to an embodiment of the present disclosure, applying the virtual light source effect to the image and displaying the image may include determining a characteristic of a virtual light source and adjusting an attribute of each of at least one pixel in the image according to the virtual light source and displaying the image.

According to an embodiment of the present disclosure, applying the virtual light source effect to the image and displaying the image may include detecting posture information on the facial area and adjusting an attribute of each of at least one pixel in the image according to a position of the virtual light source adjusted based on the detected posture information and displaying the image.

According to an embodiment of the present disclosure, determining the position of the virtual light source may include determining the position of the light source corresponding to a first angle for radiating light at a second angle preset with respect to a front side of the facial area or determining the position of the light source at the second angle, based on the detected posture information.

According to an embodiment of the present disclosure, adjusting the attribute of each of the at least one pixel in the image and displaying the image may include adjusting the attribute of each of the at least one pixel in the image and displaying the image according to a distance between the virtual light source and each of the at least one pixel.

According to an embodiment of the present disclosure, adjusting the attribute of each of the at least one pixel in the image and displaying the image may include determining a brightness adjustment ratio of each of the at least one pixel in the image according to the distance from the virtual light source and adjusting a brightness of each of the at least one pixel in the image and displaying the image according to the determined brightness adjustment ratio.

According to an embodiment of the present disclosure, adjusting the attribute of each of the at least one pixel in the image and displaying the image may include adjusting a brightness of each of the at least one pixel in the image and displaying the image based on an object attribute of the at least one object and the virtual light source.

According to an embodiment of the present disclosure, adjusting the attribute of each of the at least one pixel in the image and displaying the image may include adjusting a brightness of each of the at least one pixel in the image and displaying the image based on at least one of a determined brightness, color, and color temperature of the virtual light source.

According to an embodiment of the present disclosure, the method may further comprise obtaining light source information on an actual light source of the image, determining light source information on a virtual light source based on the light source information on the actual light source, and adjusting an attribute of each of at least one pixel in the image according to the virtual light source and displaying the image.

According to an embodiment of the present disclosure, determining the light source information on the virtual light source based on the light source information on the actual light source may include determining each of at least one of a position, brightness, color, and color temperature of the virtual light source corresponding to each of at least one of a position, brightness, color, and color temperature of the actual light source.

According to an embodiment of the present disclosure, obtaining the light source information on the actual light source of the image may include analyzing a histogram for a brightness of the image to obtain at least one of a position, brightness, color, and color temperature of the actual light source.

According to an embodiment of the present disclosure, there may be provided one or more virtual light sources.

According to an embodiment of the present disclosure, adjusting the attribute of each of the at least one pixel and displaying the image may include providing a user interface for setting light source information on the virtual light source, obtaining the light source information on the virtual light source through the user interface, and adjusting the attribute of each of the at least one pixel and displaying the image based on the obtained light source information on the virtual light source.

According to an embodiment of the present disclosure, detecting the posture information on the facial area based on the at least one object in the detected facial area may include comparing an object attribute of the at least one object with previously stored attribute information and detecting the posture information according to a result of the comparison.

According to an embodiment of the present disclosure, applying the virtual light source effect and displaying the image may include adjusting the attribute of each of the at least one pixel and displaying the image according to correlation information between the object attribute and pixel attribute adjustment information.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for controlling an electronic device, the method comprising:
   obtaining an image from an external device or a camera of the electronic device;
   detecting a facial area from the image;

detecting at least one object in the facial area from the image;

applying a virtual light source effect to the image based on an attribute of the detected at least one object, wherein the applying of the virtual light source effect includes:

identifying a brightness adjustment ratio of each of at least one pixel in the image according to a distance from a virtual light source, and adjusting a brightness of the at least one pixel in the image; and displaying the image to which the virtual light source effect is applied.

2. The method of claim 1, further comprising:
determining a characteristic of the virtual light source,
wherein the applying of the virtual light source effect to the image further comprises adjusting an attribute of the at least one pixel in the image according to the virtual light source, and
wherein the displaying of the image to which the virtual light source effect is applied further comprises displaying the image comprising the adjusted at least one pixel.

3. The method of claim 2, wherein the displaying of the image to which the virtual light source effect is applied further comprises:
displaying the image comprising the at least one pixel according to the distance between the virtual light source and each of the at least one pixel.

4. The method of claim 3, wherein the displaying of the image to which the virtual light source effect is applied further comprises:
displaying the image comprising the at least one pixel according to the identified brightness adjustment ratio.

5. The method of claim 2, wherein the displaying of the image to which the virtual light source effect is applied further comprises:
displaying the image comprising the at least one pixel;
based on an object attribute of the at least one object and the virtual light source.

6. The method of claim 2, wherein the displaying of the image to which the virtual light source effect is applied further comprises:
displaying the image, including the at least one pixel, based on at least one of a determined brightness, color, or color temperature of the virtual light source.

7. The method of claim 2, wherein the number of virtual light sources is one or more.

8. The method of claim 2, further comprises:
providing a user interface for setting light source information on the virtual light source; and
obtaining the light source information on the virtual light source through the user interface,
wherein the displaying of the image to which the virtual light source effect is applied further comprises displaying the image comprising the at least one pixel based on the obtained light source information on the virtual light source.

9. The method of claim 1, further comprising:
detecting posture information on the facial area;
wherein the applying of the virtual light source effect to the image further comprises adjusting an attribute of the at least one pixel in the image according to a position of the virtual light source adjusted based on the detected posture information, and wherein the displaying of the image to which the virtual light source effect is applied further comprises displaying the image comprising the adjusted at least one pixel.

10. The method of claim 9, further comprises:
determining the position of the virtual light source corresponding to a second angle for radiating light at a first angle preset with respect to a front side of the facial area, or
determining the position of the virtual light source at the first angle based on the detected posture information.

11. The method of claim 9, wherein the detecting of the posture information on the facial area further comprises:
comparing an object attribute of the at least one object with previously stored attribute information; and
detecting the posture information according to a result of the comparison.

12. The method of claim 1, further comprising:
obtaining light source information on an actual light source of the image;
determining light source information on the virtual light source based on the light source information on the actual light source; and
adjusting an attribute of the at least one pixel in the image according to the virtual light source.

13. The method of claim 12, wherein the determining of the light source information on the virtual light source based on the light source information on the actual light source further comprises:
determining at least one of a position, brightness, color, or color temperature of the virtual light source corresponding to each of at least one of a position, brightness, color, or color temperature of the actual light source.

14. The method of claim 12, wherein the obtaining of the light source information on the actual light source of the image further comprises:
analyzing a histogram for a brightness of the image to obtain at least one of a position, brightness, color, or color temperature of the actual light source.

15. The method of claim 1, wherein the displaying of the image to which the virtual light source effect is applied further comprises:
displaying the image, including the at least one pixel according to correlation information between the object attribute and pixel attribute adjustment information.

16. The method of claim 1, wherein the image includes two-dimensional (2D) data or three-dimensional (3D) data.

17. An electronic device, comprising:
a display;
at least one processor electrically connected to the display; and
a memory electrically connected to the processor,
wherein the memory is configured to store instructions that, when executed, configure the at least one processor to:
obtain an image from an external device or a camera of the electronic device,
detect a facial area from the image;
detect at least one object in the facial area from the image,
apply a virtual light source effect to the image based on an attribute of the at least one detected object, and
display the image,
wherein, to apply the virtual light source effect to the image, the at least one processor is further configured to:

identify a brightness adjustment ratio of each of at least one pixel in the image according to a distance from a virtual light source, and adjust a brightness of the at least one pixel in the image.

18. The electronic device of claim 17, wherein the memory is further configured to store an instruction that when executed, further configures the at least one processor to:

determine a characteristic of the virtual light source, adjust an attribute of the at least one pixel in the image according to the virtual light source, and display the image including the at least one pixel.

19. The electronic device of claim 17, wherein the memory is further configured to store an instruction that when executed, further configures the at least one processor to:

detect posture information on the facial area, adjust an attribute of each of at least one pixel in the image according to a position of the virtual light source adjusted based on the detected posture information, and display the image including the at least one pixel.

20. A method for an electronic device, the method comprising:

obtaining an image;

displaying the image on a display of the electronic device;

receiving, while displaying the image, a first command to apply a first virtual light source effect on the image;

in response to receiving the first command, adjusting a pixel value of a first part of pixels of the image as if a virtual light source is positioned at a first position;

receiving, while displaying the image, a second command to apply a second virtual light source effect on the image; and in response to receiving the second command, adjusting a pixel value of a second part of pixels of the image as if the virtual light source is positioned at a second position different from the first position.

21. The method of claim 20, further comprising:

adjusting each pixel value based on a distance between the virtual light source and each of the pixels.

22. The method of claim 20, wherein the adjusting of the pixel value of the first part of pixels of the image further comprises:

adjusting a brightness of the first part of pixels in the image; and displaying the image based on at least one of a determined brightness, color, or color temperature of the virtual light source.

23. The method of claim 20, further comprising:

displaying an user interface for guidance of at least one of position or direction of an object being included in the image.

24. An electronic device, comprising:

a display; and at least one processor electrically connected to the display, wherein the at least one processor is configured to:

obtain an image, display the image on a display of the electronic device, receive, while displaying the image, a first command to apply a first virtual light source effect on the image, in response to receiving the first command, adjust a pixel value of a first part of pixels of the image as if a virtual light source is positioned at a first position, receive, while displaying the image, a second command to apply a second virtual light source effect on the image, and in response to receiving the second command, adjust a pixel value of a second part of pixels of the image as if the virtual light source is positioned at a second position different from the first position.

25. The electronic device of claim 24, wherein the at least one processor is further configured to adjust each pixel value based on a distance between the virtual light source and each of the pixels.

26. The electronic device of claim 24, wherein the at least one processor is further configured to:

adjust a brightness of the first part of pixels in the image, and display the image based on at least one of a determined brightness, color, or color temperature of the virtual light source.

27. The electronic device of claim 24, wherein the at least one processor is further configured to display a user interface for guidance of at least one of position or direction of an object included in the image.

* * * * *